US012810286B2

(12) United States Patent
Saxena et al.

(10) Patent No.: US 12,810,286 B2
(45) Date of Patent: Nov. 24, 2026

(54) SYSTEMS AND METHODS FOR CRYPTOGRAPHIC JOINT CUSTODY SECURE STORAGE OF DIGITAL DATA OBJECTS ON DISTRIBUTED LEDGER DATA STRUCTURES

(71) Applicant: HSBC GROUP MANAGEMENT SERVICES LIMITED, London (GB)

(72) Inventors: Prashant Saxena, Hyderabad (IN); Nirav Poornank, Pune (IN); Ankit Agrawal, Pune (IN); Rushikesh Pable, Pune (IN); Madhusudhan Mishra, Pune (IN); Sreenivas Reddy, Pune (IN); Anmol Gautam, Pune (IN); Rakesh Kumar Dash, Pune (IN); Mrunal Deshpande, Hyderabad (IN); Pankaj Deshkar, Pune (IN)

(73) Assignee: HSBC GROUP MANAGEMENT SERVICES LIMITED, London (GB)

( * ) Notice: Subject to any disclaimer, the term of this patent is extended or adjusted under 35 U.S.C. 154(b) by 32 days.

(21) Appl. No.: 18/930,634

(22) Filed: Oct. 29, 2024

(65) Prior Publication Data

US 2025/0053968 A1 Feb. 13, 2025

(51) Int. Cl.
*G06Q 20/38* (2012.01)
*G06Q 20/36* (2012.01)

(52) U.S. Cl.
CPC ....... *G06Q 20/3825* (2013.01); *G06Q 20/367* (2013.01)

(58) Field of Classification Search
CPC ............. G06Q 20/3825; G06Q 20/367; G06Q 20/0655; G06Q 20/02; G06Q 20/3829;
(Continued)

(56) References Cited

U.S. PATENT DOCUMENTS

2020/0005282 A1* 1/2020 Kim ..................... G06Q 20/065
2021/0374731 A1* 12/2021 Kim ................... G06Q 20/3829
(Continued)

OTHER PUBLICATIONS

Gnosis (2017) Gnosis safe contracts. Retrieved from: https://github.com/destenson/gnosis--gnosis-safe-contracts/blob/master/contracts/GnosisSafe.sol on Jan. 8, 2026 (Year: 2017).*
"Adobe® Experience Manager as a Managed Service Security Overview Whitepaper", Adobe Experience Cloud, 19 pages, Feb. 2022.
(Continued)

*Primary Examiner* — Brian F Shaw
(74) *Attorney, Agent, or Firm* — Dentons Durham Jones Pinegar P.C.

(57) ABSTRACT

A computer implemented approach is proposed for computationally establishing joint custodial features to augment functionality of digital data objects recorded on a distributed ledger data structure. A specialized smart contract data object used as an improved digital wallet object is persisted on the distributed ledger data structure which provides a feature interface between a cryptographic wallet controlled directly by an individual, and a set of institutional computing systems and corresponding protocols. The specialized smart contract data object is configured to be a multi-signature joint custody safe data object, the specialized smart contract data object persisted as an interactive data object on a decentralized virtual environment that is configured to automatically execute code consistently and securely across nodes of a decentralized network whose ledger forms a Turing Complete state-machine based computing environment.

20 Claims, 14 Drawing Sheets

(58) Field of Classification Search
CPC .. G06Q 20/389; G06Q 20/3674; G06Q 20/06; G06Q 20/382; H04L 9/3236; H04L 9/0643; H04L 9/3247; G06F 21/602
See application file for complete search history.

(56) References Cited

U.S. PATENT DOCUMENTS

| | | | | |
|---|---|---|---|---|
| 2021/0383363 | A1* | 12/2021 | Smirnov | G06Q 20/3674 |
| 2022/0116214 | A1* | 4/2022 | Jentzsch | G06Q 20/3821 |
| 2022/0138735 | A1* | 5/2022 | Madisetti | G06Q 20/0655<br>705/44 |
| 2025/0014099 | A1* | 1/2025 | Dincoglu | G06Q 40/04 |

OTHER PUBLICATIONS

"MetaMask Institutional: The DeFi wallet and Web3 gateway for crypto funds, market makers, and trading desks", Consensys, 2021, 34 pages.
Boyle et al., "Future of Money: Crypto, CBDCs and 21st Century Cash", *Citi GPS: Global Perspectives & Solutions*, 104 pages, 2021.
Gnosis Whitepaper, https://blockchainlab.com/pdf/gnosis_whitepaper.pdf, 2017.
Pitchikala, K.M., "The Benefits of Adobe Experience Manager for Simplifying Online Content Hosting", *IJSR*, 10(3):pp. 2005-2008, 2021.
Snow et al., "HSM Guide—An introduction to HSMs", 35 pages, https://github.com/snowch/hsm-guide/blob/master/book.md.

* cited by examiner

SYSTEMS AND METHODS FOR CRYPTOGRAPHIC JOINT CUSTODY SECURE STORAGE OF DIGITAL DATA OBJECTS ON DISTRIBUTED LEDGER DATA STRUCTURES

FIELD OF DISCLOSURE

The present application relates to cryptography for blockchains and distributed ledger technology, and more specifically, to systems and methods for implementing cryptographically establishing joint custody secure storage of digital data objects on a distributed ledger data structure.

BACKGROUND

Computerized representation of certain assets has evolved from a Web 2.0 centralized computing approach to a Web 3.0 decentralized computing approach. In Web 2.0 based approaches, centralized intermediaries and trusted systems were utilized to process and conduct transactions. In a Web 3.0 paradigm, there is a much heavier computer and network architectural design emphasis on decentralized approaches, such as using blockchain data objects maintained across a distributed plurality of distributed ledger data structures which operate in accordance with a consensus protocol to determine how to update the blockchain data objects on the distributed ledger data structures with new transactions and records. For example, blockchains such as Ethereum support storage of digital assets, such as cryptocurrencies and crypto tokens. These assets can be exchanged between users via blockchain transactions. Ownership of assets is managed using asymmetric cryptographic techniques via public/private key pairs. In typical approaches, an asset can be sent to a blockchain address derived from a public key. Only the holder of the corresponding private key is then able to make use of that asset, for example by signing transactions to transfer the asset to another address. As such, the holder of the private key associated with an asset is essentially the owner of that asset. Whilst this provides security benefits (such as preventing theft of assets as long as keys are kept secure), loss of a key by the user effectively results in loss of the asset itself because without the key, the asset can no longer be passed on or traded.

A technical problem that arises with private keys is that that private keys are prone to loss, and while effective, provide only a simple mechanism to prove ownership and to conduct transactions. For example, private keys are typically long (and essentially random) binary strings (256-bit keys are used in Ethereum), and a user may need to hold many such keys. Securely keeping track of such keys can be challenging. One approach to manage this is via crypto wallets, which are software or hardware solutions for storing key pairs on behalf of a user. Hardware solutions may store keys on a physical device (e.g. USB drive) whilst software solutions store keys either locally on a user's computer or in the cloud. Access to wallets is typically protected by some form of user credentials, e.g. usernames and passwords or passphrases. However, loss of the access credentials for the wallet can then result in loss of any keys stored in that wallet and hence the associated crypto assets. Wallet-based solutions, whilst convenient for the user, can thus exacerbate the risk of blockchain assets being lost.

SUMMARY

A computer implemented approach is proposed for computationally establishing joint custodial features to augment functionality of digital data objects recorded on a distributed ledger data structure. A specialized smart contract data object is persisted on the distributed ledger data structure which effectively provides a feature interface between a cryptographic wallet controlled directly by an individual, and a set of institutional computing systems and corresponding protocols. The specialized smart contract data object is configured to be a multi-signature joint custody safe data object, the specialized smart contract data object persisted as an interactive data object on a decentralized virtual environment that is configured to automatically execute code consistently and securely across nodes of a decentralized network whose ledger forms a Turing Complete state-machine based computing environment.

The approach is designed as a mechanism to bridge the Web 2.0 evolution to utilize Web 3.0 technology, while providing computational safeguards and using a variable multi-signature joint custody safe data object that is implemented using a smart contract that is interacted with when transactions are requested. The multi-signature joint custody safe data object acts as a computing intermediary to add a number of Web 2.0 derived computational safeguards. These safeguards include lost key re-generation, increased security checkpoints before initiating a transfer, analogous to Web 2.0 services. The system incurs additional transaction and execution fees relative to a direct transfer request through holding digital assets using only a public key/private key.

As an example, banks can be a custodian of the digital assets owned by customers and the private keys in this approach. Banks are trusted entities that have developed advanced strategies to safeguard internet banking credentials for its customers, such as Multi Factor Authentication (MFA), encryption (both in-transit and at rest), Privilege Access Management (within the bank), phishing/malware protection, device & network security and most importantly, account recovery. As money changes form—physical to digital, banks have a responsibility to safeguard digital assets too. As custodian of the private keys, banks would be responsible for signing off on transactions for customers. Banks can leverage existing Web2.0 architecture for custody of the private keys and seamlessly integrate to distributed ledger technology (DLT) based chain networks (Web3.0) to offer the custody solution of digital assets to its customers.

The system is configured for interoperation with a Web 2.0 front-end, such as an online banking portal, where a user is able to configure a digital wallet to hold Web 3.0 assets, such as cryptoassets, NFTs, among others. NFTs can be used for digital collectables, or represent rights associated with real-world assets, such as ownership of a vehicle, land, or certain types of licenses. The user is able to transfer existing digital assets to a digital address corresponding to a multiple-signature joint custody safe data object for the user, which then is configured to safely store the private key on a highly secure custodial system that is configured for maximal availability. The multiple-signature joint custody safe data object can be instantiated through interacting with a multiple-signature joint custody safe smart contract that is configured to spawns instances of the multiple-signature joint custody safe data object upon request. As the user already has access to the online banking portal, the user is already a verified user and in some embodiments, a "KYC" "know your client" token is also generated for the user that can be a signed token that resides either on a Web 2.0 server backend, the user's device, or is uploaded as a data payload on a distributed ledger, such as being minted as a non-fungible token corresponding to the user and representing the KYC status of the user. In some embodiments, a KYC token can valid only for a certain period of time (e.g., a new token needs to be obtained each time), or it can be revoked using a corresponding signed message.

Once the multiple-signature joint custody safe data object is instantiated, the multiple-signature joint custody safe data object includes pointers to a first owner address, and then a plurality of safe custodial addresses, which can be trusted automated system accounts. As the number of trusted automated system accounts increases, the overall cybersecurity of the smart contract increases as the number of computing devices that need to be simultaneously breached. However, as described further below, as the number of trusted automated system accounts increases, the computational costs also correspondingly grow. The safe custodial addresses can include automated approval/disapproval agents, such as agents that operate daemon processes that are configured to generate automated signed approval messages based on validation of a user's KYC token, validation of a target recipient's KYC token, comparisons against blacklist/whitelist data sets.

The generated smart contract data object is customized from a base template smart contract data object that has been security and functionality audited, and once instantiated, the smart contract data object is configured to persist on the selected decentralized virtual environment such that the smart contract data object is capable of being associated with digital asset objects that are assigned to it by way of transactions on the selected decentralized virtual environment.

It is important to note that any computing operations conducted by the specialized smart contract data object require incurring network fees that are directly proportionate to the quantity and complexity of the computational actions being taken by the smart contract data object, and a technical object of the approach described herein is to minimize the computing cost and thus the incurred network fees through optimizations described herein.

In some embodiments, the smart contract data object is configured to require a different number of cryptographic approvals from the associated wallets. The smart contract data object can be configured with executable logic that performs a transaction based on requirements being met in the smart contract data object, but the requirements can vary. The linked wallets can include a diversity of different types of associated agents. For example, a first linked wallet, in some embodiments, connects to an agent/daemon process that operates an automated approver that generates signed messages for when KYC requirements are met by validating that either the user, the target, or both, have validly persisting unrevoked KYC tokens on the distributed ledger system. The agent/daemon process that operates the automated approver can be configured to traverse a pointer KYC field in the multiple-signature joint custody safe to identify the address of the corresponding KYC token of the user.

In a variant embodiment, the smart contract of the multiple-signature joint custody safe further includes an additional encrypted data payload that is further persisted as a record of smart contract interactions and/or other associated information to be appended on the record of smart contract interactions, such as KYC/anti money laundering requirements. Accordingly, every transaction associated with the multiple-signature joint custody safe includes a verification digest of the KYC token that is stored, generated by the agent/daemon process that operates the automated approver. By having this information appended onto a record of interactions, the payload can be interrogated during future validations and audit, allowing, for example, an audit node operating a block explorer or block viewer to be able to trace all corresponding transactions and automatically validate that a valid KYC token was available at the time of the transaction.

The system can be coupled with and interoperate through a corresponding online banking framework that associates each multiple-signature joint custody safe with a corresponding financial institution account, for example, through using a unique user ID, or a proxy ID. Accordingly, when the user is using the user's online banking system in a Web 2.0 context, the user interface is able to surface or render a digital wallet showing assets held in a modified Web 3.0 framework as proposed herein, where the digital wallet includes the assets stored in the corresponding multiple-signature joint custody safe, and the user interacts with the multiple-signature joint custody safe through the online banking system.

When the user wishes to conduct a transaction relating to the digital objects representing the assets on the multiple-signature joint custody safe, the multiple-signature joint custody safe smart contract is invoked and interacted with to approve transactions where all of the corresponding custodial wallets have provided signed messages.

These custodial wallets can include automated agents that conduct additional client checking, and can also include other custodial wallets such as manual, semi-automated, or fully automated agents that only provide signed messages upon a further validation. The additional validations are useful to provide a staged, manual transfer approval flow (or automated/semi-automated agent approvals) when the multiple-signature joint custody safe can be configured with a variable M of N signature requirement that can be modified based on transfer thresholds (e.g., for transactions below a particular threshold, only the automated approval daemon's signed message is required, but for transactions above the threshold, two or more signed messages are required, one of the additional signed messages requiring a second user to sign a corresponding message to be provided to the multiple-signature joint custody safe smart contract before the transaction continues to proceed).

An example semi-automated or automated agent approval can include a signed message only to be generated upon a successful verification of a time-based cryptogram that is a data structure that resides at in accordance to a pointer location provided to the smart contract (e.g., can be stored off-chain, or on-chain), the time-based cryptogram generated based on a "know your client" validation/verification process to ensure that an on-going compliance requirement is being periodically or continuously met for the owner of the custodial safe, automatically providing signatures as an additional validation and verification step. The signed message can be stored as an immutable data record on the corresponding blockchain as part of the transaction receipt such that an audit node or audit process can automatically verify that the transaction also included a successful validation of the cryptogram. In a further embodiment, a hash or representation generated from the cryptogram (e.g., a MD5 hash of the cryptogram) can also be recorded as part of the receipt for a deeper level of validation (e.g., to prove the veracity of the validation, in addition to the validation occurring). The hash or representation generated from the cryptogram can be generated using, or can include the public key of the verification agent custodial wallet for improved cross-validation capabilities.

In some embodiments, an off-chain database can be coupled to the spawned smart contract data object operating on-chain (e.g., on the Ethereum Virtual Machine). The off-chain database can be operating on hardware located on the user's device, and the off-chain database includes one or more data records, such as data tables, having data fields to store M of N signature requirements that can be dynamically modified by the user via secured login through internet banking. The requirements can be based on, for example, amount thresholds or frequency of transactions over a given period (e.g., daily, monthly, annually). Users can input preferences for threshold limits on the centralized Web 2.0 online banking interface, which then inform how the Web 3.0 smart contract/on-chain transactions occur.

The off-chain and the on-chain smart contract operate together to establish a set of user defined amount thresholds, for example, where the value is captured in as data fields in the off-chain database, and the smart contract can be configured to have a pointer data object that refers to the off-chain database or a suitable API such that the smart contract can automatically execute the code to query/obtain as a responding message the user defined amount thresholds. It is important to recognize that from a technical computing perspective, every additional validation step taken by the smart contract incurs additional computing cycles on the virtual state machine maintained by the system, which both slows down the process and incurs computing costs in the form of gas fees, so being able to control which thresholds of transactions incur additional gas for improved cybersecurity/custodial smart contract features is a useful tool to allow the user to control the amount of computing cost to be incurred. In some embodiments, there may be baseline settings in the smart contract, such as transactions over a threshold amount requiring at least "know your client" validation/sign off through the associated automated agent conducting the validation and generating a signed object for processing by the smart contract.

The transaction proceeds by invoking a function of the multiple-signature joint custody safe where the underlying private key is retrieved from the high security, high availability storage, and used to sign a message to transfer the digital asset to the target wallet address.

The foregoing has outlined the features and technical advantages in order that the detailed description that follows may be better understood. Additional features and advantages will be described hereinafter. It should be appreciated that the conception and specific embodiment disclosed may be readily utilized as a basis for modifying or designing other structures. It should also be realized that such equivalent constructions do not depart from the spirit and scope of the embodiments described herein. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the embodiments described herein.

BRIEF DESCRIPTION OF THE FIGURES

For a more complete understanding of the disclosed methods and apparatuses, reference should be made to the implementations illustrated in greater detail in the accompanying drawings, wherein.

Figure 1:
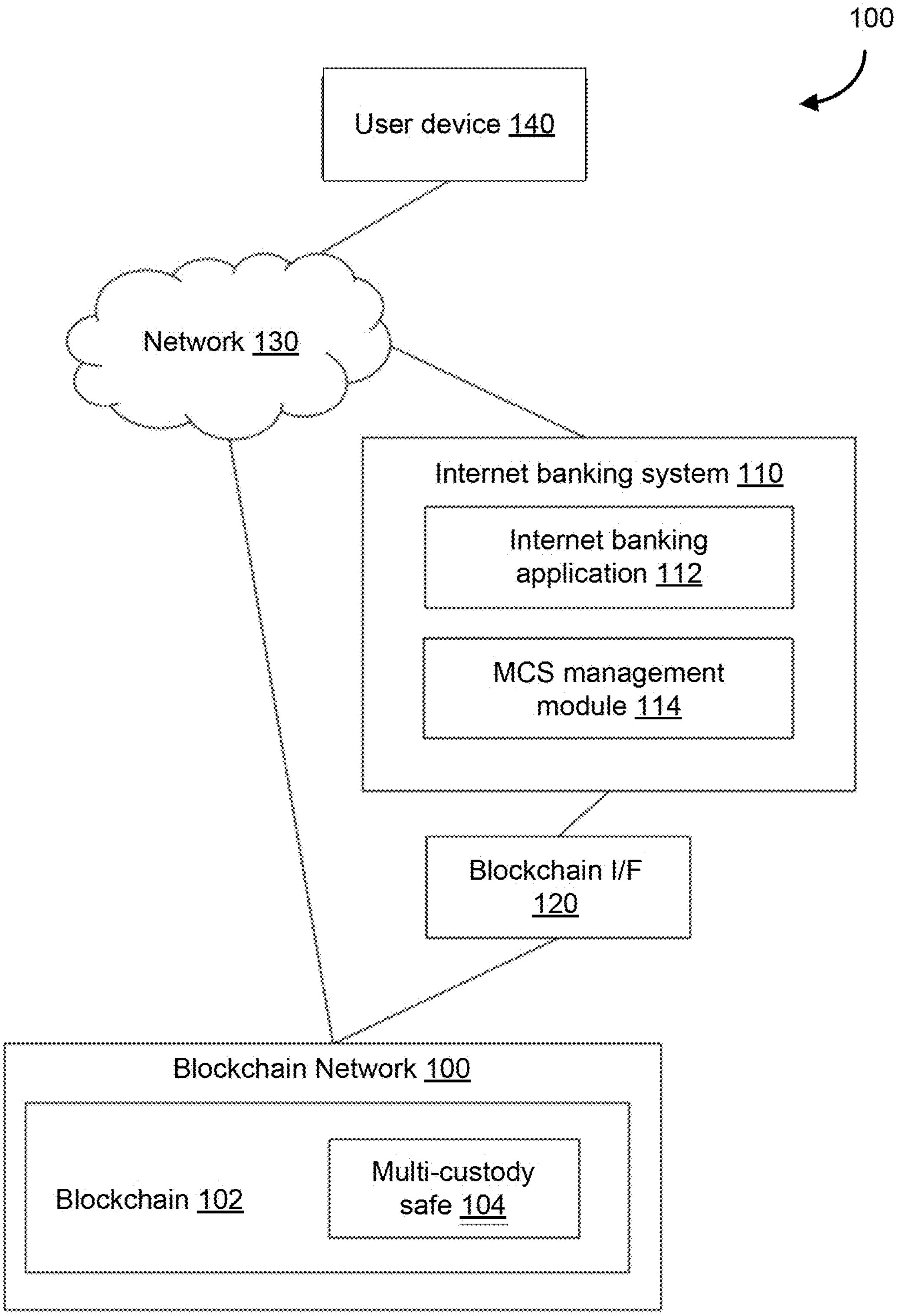
FIG. 1 illustrates a system for managing multi-custody safes for crypto assets.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

A computer system is described in various embodiments herein that is configured for managing a form of cryptographic object wallet, referred to herein as a multi-custody safe (MCS), that is specially adapted for storing digital assets such as cryptocurrencies and NFTs (non-fungible tokens) on a blockchain using a specific multi-custodial storage approach. The multi-custody safe function is integrated with a service provider's Internet banking platform through smart contract interfaces as described herein. To sign transactions from the safe, end users use a personal private key (e.g., stored in a software wallet such as Metamask™ or hardware wallet such as a Trezor™ USB key or the like). In the described system, multi-custody safes are co-owned by the end user and the service provider to provide a failsafe mechanism for regaining access in case the end user loses access to their private key (e.g., by losing the access credentials for a wallet storing the private key).

The multi-custody safe is implemented by way of a smart contract deployed and maintained on the blockchain as a persistent data object, allowing configuration of service-provider specific rules (such as risk controls) governing use of the multi-custody safe and transactions involving the safe. The safe smart contract object itself can be instantiated based on an interaction with another smart contract that spawns instances of safe smart contracts, and can be interacted through exposed operational interfaces that cause the smart contract to undergo state changes as provided in the logical instructions persisted on the smart contract data object on a distributed ledger. For example, a financial institution may deploy a master safe generator smart contract that has been rigorously audited and code tested, and the master safe generator smart contract is configured to receive instruction sets and parameters, and when interacted with, for example, through an exposed function of the master safe generator smart contract, generates an individualized child safe smart contract for providing a multi-custody safe that is adapted for a particular user.

Accordingly, a computing solution is provided that combines the capabilities of a decentralized blockchain with interactions with a computing interface portal on a centralized system, using the smart contract data object as an effective bridge between the two interfaces for providing improved cybersecurity and validation through controlling state changes on the smart contract. As this bridge is a computing data object that is persisted on as a smart contract operating on a virtual state machine on the distributed ledger network, it is important to consider the computing state change costs during code execution on the smart contract, as every node in the distributed ledger network is executing identical instructions on a large number of decentralized nodes for establishing state consensus (with the benefit being improved data integrity and immutability), and thus the computing state change costs can be significant and costly relative to centralized computers. In some embodiments described herein, approaches are also proposed in a variation to utilize off-chain computing for handling thresholds, for example, which can provide a computational mechanism to allow for control of how much additional expensive on-chain computing is utilized.

The master safe generator smart contract can have a reserve of cryptocurrency linked in an associated wallet to pay for gas fees incurred through the spawning operations. Once the individual safe smart contract is deployed, it can be interacted with as described herein as a computing mechanism/persistent data structure configured for providing improved operability characteristics for related objects on the blockchain at the cost of increased gas/computing requirements.

A system for implementing the described techniques is illustrated in FIG. 1.

The system includes a blockchain network 100 managing a blockchain 102. A blockchain is a chain of cryptographically linked data blocks, which is managed in a distributed manner by a set of computing devices referred to as blockchain nodes, which together form the blockchain network 100. Thus, although shown as a single entity, the blockchain network in practice consists of any number of devices which may be widely distributed and interconnected across various networks. Each blockchain node typically stores a partial or complete copy of the blockchain. Changes are made to the blockchain by adding blocks to the chain, which involves consensus between blockchain nodes in accordance with the particular consensus mechanism implemented by the blockchain. Consensus between blockchain nodes is used to ensure that each copy of the blockchain is updated in accordance with consensus logic, approving or overruling various proposed updates to the blockchain such that every copy of the blockchain is updated similarly at a particular snapshot of time.

The blockchain itself includes data entities (e.g., data and/or transaction records) and executable code referred to as smart contracts which can be executed by blockchain nodes to perform various functions and transactions and modify data stored on the blockchain. In an embodiment, the blockchain 102 is the Ethereum blockchain, but other blockchain technologies/blockchain infrastructure may be used.

In the described system, the blockchain 102 includes a multi-custody safe 104, in the form of a smart contract and associated data, for storing crypto assets on behalf of a user. The term "crypto asset" here can refer to any form of digital asset that may be stored, managed, transferred/traded etc. on the blockchain. Crypto assets can include, for example, quantities of cryptocurrencies and/or various types of crypto tokens, such as fungible and non-fungible tokens (NFTs). While a single multi-custody safe is shown in practice many such safes may be deployed to the blockchain for a population of users. Each user can have its own coupled safe, providing a Web 2.0/Web. 3.0 interface through the usage of the safe, the safe being a smart contract that is associated with their Web 2.0 type interface portal (e.g., online banking system), the safe storing Web 3.0 type assets such as NFTs, cryptocurrencies, etc., but providing an additional layer of functionality that is exposed through the specific smart contract interfaces.

The multi-custody safe is set up and managed on behalf of the end user by an Internet banking system 110. The Internet banking system 110 includes an Internet banking application 112 (e.g., in the form of a Web app backend running on one or more servers) for operating a conventional Internet banking service, accessible by the end use on a user device 140 connected via a wide area network 130 (such as the Internet). Wide area network 130 may in practice comprise wired and wireless networks, e.g., core networks, broadband access networks, cellular networks, Wi-Fi™ networks etc. The user device 140 may be a device able to access the Internet banking application, such as a personal computer, tablet computer, smartphone or the like. The Internet banking application may be provided in the form of a web application that a user interacts with via a browser on the user device, a dedicated smartphone application.

In addition to an Internet banking application (e.g., for viewing bank account information, making transfers, configuring banking services and products etc.), the Internet banking system provides a multi-custody safe (MCS) management module 114 for setting up and managing multi-custody safes for users. The MCS management module 114 allows a user to configure a multi-custody safe, view assets stored in the safe, and initiate transfers of assets from the safe. As described in more detail later, the module also provides recovery functionality for recovering assets from the safe if the user loses access information required to access the safe and/or sign transactions from the safe. The MCS management module may be provided as a separate application (e.g., accessible from the Internet banking application) or may be integrated directly into the Internet banking application. The MCS management module interacts via a blockchain interface 120 with the blockchain network 100 to configure the multi-custody safe 104 and carry out transactions. Additionally, the Internet banking system may interface with backend banking systems (not shown) to perform conventional banking functions.

Figure 2:
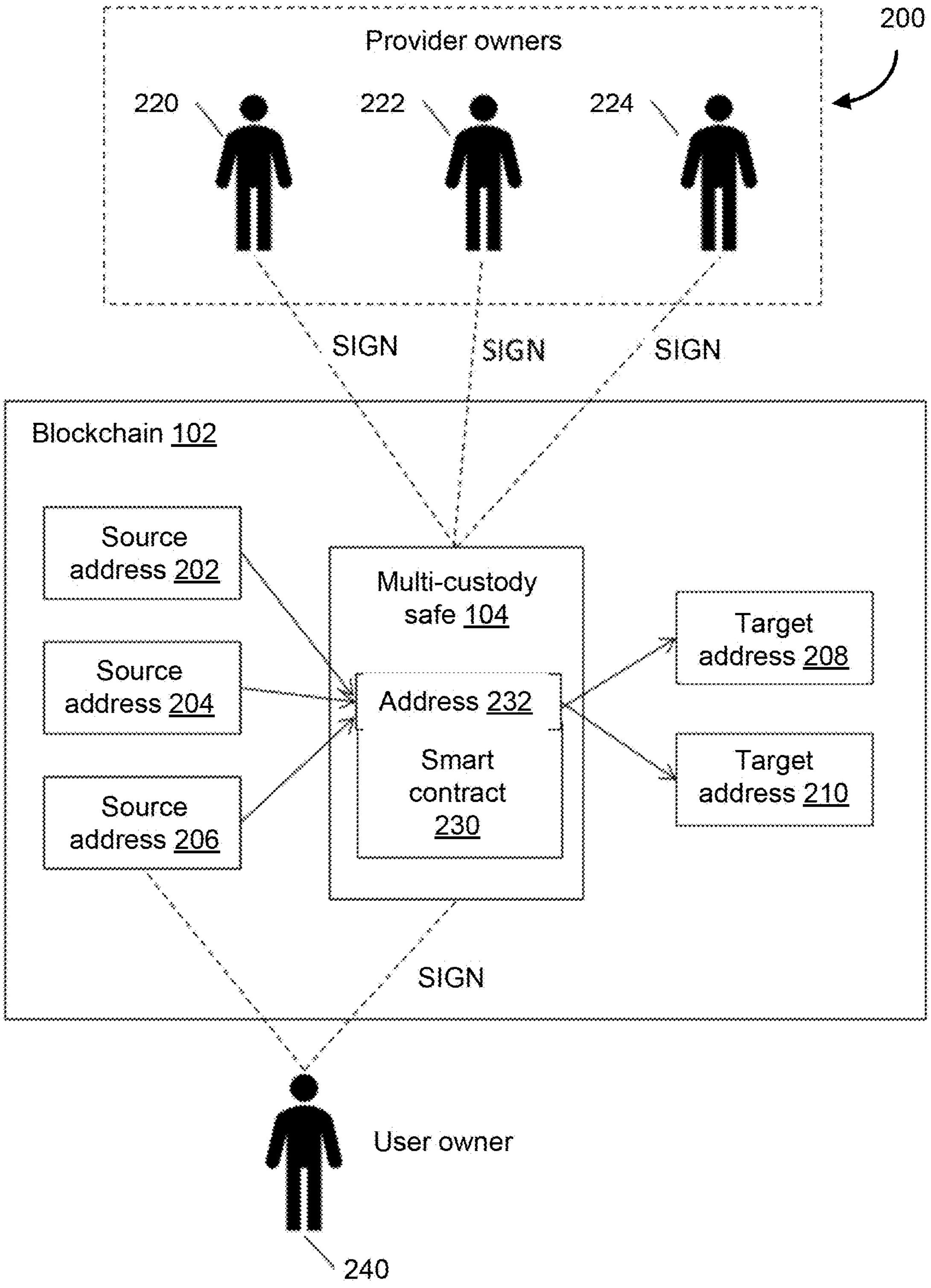
FIG. 2 illustrates use of a multi-custody safe for incoming and outgoing transactions.

FIG. 2 illustrates ingoing and outgoing transactions involving a multi-custody safe.

The multi-custody safe 102 is implemented by way of a smart contract 230, which is associated with a blockchain address 232. The smart contract includes operations for accepting incoming transactions (transactions for transferring assets to the multi-custody safe) and for performing outgoing transactions (transactions for transferring assets from the multi-custody safe to other blockchain addresses). The Safe Smart Contract can operate on either of 2 configurations—1. Multi Signature Wallet (each party signs with unique private key owned by them to see thru transaction). 2. MPC (multiparty computation) Wallets (one private key is split and shared with multiple parties in encrypted format. Splits are joined together using MPC algorithms to process a transaction).

The multi-custody safe is configured to have multiple "owners", where each owner corresponds to a unique private key for signing transactions. Furthermore, each transaction for transferring an asset from the multi-custody safe to some target address is required to be signed by multiple owners for the transaction to be valid. More specifically, signature is required by multiple ones of the private keys associated with the safe (signature by an owner generally refers to herein as signature using a private key associated with that owner).

In one example, the multi-custody safe may have four owners, with signatures from any three required to carry out a transaction. More generally, the safe may be set up to require m-of-n signatures, where n is the total number of owners (private keys) defined for the safe and m is the number of signatures required for a transaction to be carried out.

The multi-custody safe is implemented to have one user owner (corresponding to the actual owner, i.e. the end user for whom the safe is being provided and who will use the safe to store crypto assets), and a certain number of service provider owners (typically at least two). The service provider owners correspond to private keys managed by the service provider (e.g., bank). Note that such a service provider owner may not necessarily correspond to a particular individual employee of the service provider but instead various employees may have access to the provider owner private keys to be able to sign transactions. Thus, custody of the multi-custody safe is shared between the end user and the service provider.

FIG. 2 illustrates an example in which the multi-custody safe is configured with four owners—one user owner 240 and three provider owners 220, 222 and 224. Each owner corresponds to a private key that can be used to sign transactions performed by the multi-custody safe. The owners can be individuals or institutional signatories.

As noted above, the multi-custody safe 104 is identified by a blockchain address 232. Assets can be transferred from external sources (e.g., source addresses 202, 204, 206) to the multi-custody safe by way of standard blockchain transactions made to that address. For example, the user owner 240 can transfer assets from another address 206 that they control to the safe by performing a transaction targeting the safe address 232. The user owner 240 can also provide the safe address 232 to other users to allow other users to make transactions to transfer assets to the safe.

The user owner can also initiate transactions to transfer assets from the multi-custody safe 104 to target addresses (e.g., 208, 210). However, those transactions require signature by multiple owners (using their respective private keys). In the present example, the multi-custody safe may be configured to require signatures by at least three of the four owners. For a normal transaction, one of those signatures will be added by the user owner 240 when creating the transaction. Subsequently, at least two of the provider owners 220-224 are also required to sign the transaction for the transaction to be valid.

The number of provider owners configured (in addition to the user owner 240) may be variable and may be configured for each multi-custody safe 104 when the safe is first set up. Similarly, the number of required signatures for a valid transaction may also be configured at that point. For example, if two out of four signatures are needed, then for a regular transaction, signatures would be obtained from the user owner 240 and one of the provider owners 220-224. Note that any of the provider owner keys may be used to sign the transaction, as long as the total number of signatures (including user owner signature) meets the threshold defined for the safe.

Figure 3:
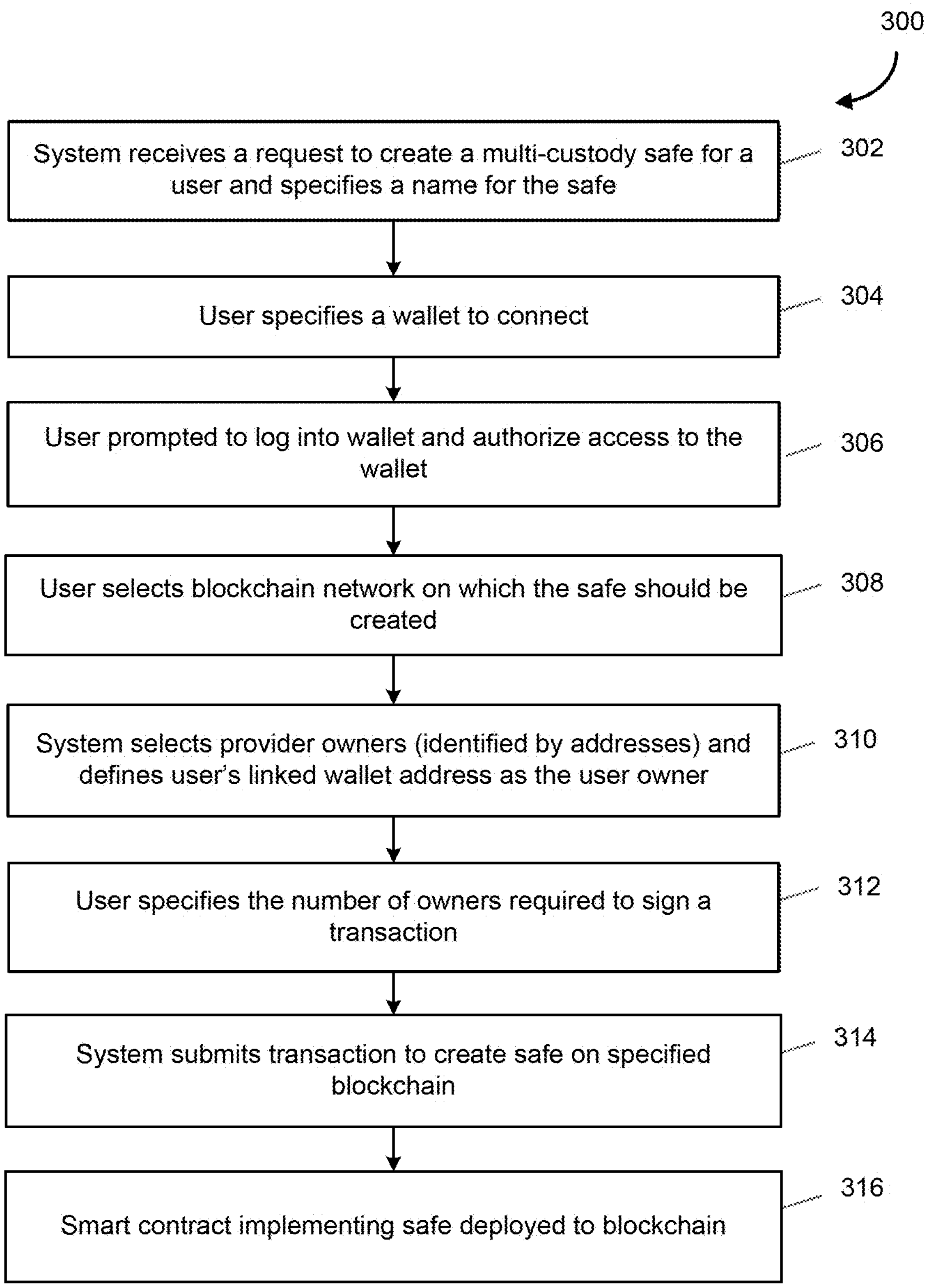
FIG. 3 illustrates a process for configuring a new multi-custody safe.

FIG. 3 illustrates a process for setting up a multi-custody safe. The process assumes that the user has logged into the Internet banking application, and thus the user identity has been established and the user has been authenticated.

In step 302, the system receives a request to create a multi-custody safe for a user. For example, the safe creation may be provided as a selectable option within the Internet banking application. The user may also specify a name for the multi-custody safe (e.g., to distinguish the safe if the user has multiple safes). In step 304, the user is prompted to specify a crypto wallet to connect. For example, this may be a MetaMask or similar wallet managed by software running on the user's device. In step 306, the user is prompted to log into the wallet and authorize access to the wallet by the safe. In some embodiments, the user can also set up seed phrase recovery, similar to password recovery for internet banking in Web 2.0, to enable the user to access and recover digital assets in the wallet. In step 308, the user is given an option to select the blockchain network on which the safe should be created (alternatively the system may use a single network for all safes). The user is warned that the safe can only receive assets on the selected network.

In step 310, the system defines the set of safe "owners". Each owner is identified by a wallet address. The wallet address is a public key that was instantiated with a corresponding private key, such that the wallet address of the "owner" can use the private key to generate signatures, digests, and to encrypt various types of data messages. The owners include the user owner (end user), specified in the form of the address of the user's connected wallet (connected in steps 304-306), and multiple provider owners, specified by way of wallet addresses of wallets managed by the service provider (corresponding to the provider owners).

The latter may be a fixed set of wallet addresses used for each multi-custody safe, or the system may select the required number of provider owners from a pool of available wallet addresses. The owner wallets, as noted in a number of variations below, can be coupled to data processes or automated agents, such as daemon processes, that operate on the blockchain and automatically or semi-automatically generate signed messages that can be used for controlling various interactions with the multi-custody safe 104. The wallet addresses can include, for example, automated systems that are used to automatically validate associated data tokens (e.g., a user's uploaded "know your client token") before providing a signature or a signed message. The owners can also include other users, such as a parent or a guardian, or a conservator, who is responsible for the user and whose sign off is required before a transaction can occur in respect of the multi-custody safe 104.

In step 312, the user specifies the number of owners required to sign a transaction. Typically, this is at least one less than the total number of safe owners (to allow recovery as discussed later). In an example, at least two signatories may be required, so that a standard transaction would be signed by the user owner and at least one provider owner. The at least two signatures can be from automated data process related wallets, which require additional validation using tokens (e.g., KYC token) or comparison to oracle nodes.

The number of safe owners and/or a corresponding minimum number of signatures required to effectuate a transaction relating to the multi-custody safe 104 can vary, for example, dynamically, as noted below, depending on characteristics of a particular request being made, such as the type of request, or an associated value threshold of the request. The multi-custody safe 104, during instantiation, may include a coupled pointer to an oracle system or off-chain database that is used for setting dynamic parameters and thus dynamic operational characteristics of the multi-custody safe 104. T In some embodiments, the required signatories can be based on, for example, amount thresholds or frequency of transactions over a given period (e.g., daily, monthly, annually). Users can input preferences for threshold limits on the centralized Web 2.0 online banking interface, which then informs how the Web 3.0 smart contract/on-chain transactions occur. An off-chain database that is coupled to the spawned smart contract data object operating on-chain (e.g., on the Ethereum Virtual Machine) can be used to store the requirements.

The off-chain database can be operating on hardware located at the banking institution, and the off-chain database includes one or more data records, such as data tables, having data fields to store M of N signature requirements that can be dynamically modified by the user via secured login through internet banking and stored within the banking institution's off-chain database. The user customer can access the off-chain database when they initiate a safe transaction. With this option, users will have the ability to skip the need for multiple signatory approvals based on the value of the transactions.

The off-chain and the on-chain smart contract operate together to establish a set of user defined amount thresholds, for example, where the value is captured in as data fields in the off-chain database, and the smart contract can be configured to have a pointer data object that refers to the off-chain database or a suitable API such that the smart contract can automatically execute the code to query/obtain as a responding message the user defined amount thresholds. The on-chain smart contract can be implemented with dynamic values and pointers to trusted Web 2.0 data elements that are either set through an oracle system or through referencing an off-chain data structure acting as an oracle node set by the user (e.g., it looks at the pointer). For example, a dynamic rule set by a user could be: all transactions that involve 100 USD or above require 3 of 4 signatures, but all transactions that involve 1,000 USD or above requires 4 of 4 signatures. This scenario can occur when the user has had identity fraud in the past and is willing to pay extra costs, for example gas cost in the case of Ethereum blockchain, for higher security. This approach provides customers and users with more flexibility to transact, similar to what banking institutions offer through Web 2.0 for money transfers, cheques, cards, etc. By offering limit setting for transactions via these payment modes, internet and mobile banking channels provide a way to safeguard customer interests and protect their financial assets.

In step 314, the system submits a transaction to the selected blockchain to create the multi-custody safe. This operation deploys (at step 316) a new smart contract implementing the safe to the selected blockchain and returns the blockchain address of the smart contract as the safe address. If necessary, transaction costs for deploying the smart contract are debited from an account associated with the service provider (e.g., linked to an administrator user creating the safe). The transaction cost could correspond to the gas cost in the case of the Ethereum blockchain.

Once the child multi-signature safe has been created on the target platform, the safe address is provided to the user, by displaying on the screen as an alphanumeric address or QR code. The user can then use the address to transfer cryptocurrency funds (e.g., Ether) or crypto tokens (e.g., NFTs) to the multi-custody safe. Such transactions can be performed externally in the usual way, using any suitable payment tool, wallet etc. to create a transaction on the relevant blockchain.

The multi-custody safe smart contract is configured to accept a relevant set of crypto assets; for example, in the case of Ethereum, the smart contract may implement interfaces to accept:

Ethereum cryptocurrency (ETHER or ETH);

ERC 20 fungible tokens;

ERC 721 non-fungible tokens (NFTs); and

ERC 1155 tokens.

The above are examples and other token or asset types may be implemented. The specific types of tokens and assets supported will also depend on the targeted blockchain.

Once created, information about the multi-custody safe (e.g., address and configuration data) is stored in a database (for example linked to the user's Internet banking account), and access is enabled via the MCS management module (114) to allow the user to manage the safe and create transactions for transferring crypto assets from the safe to target addresses. The MCS management module may be implemented as a part of the Internet banking application, or as a separate application (which may e.g., be invoked from the Internet banking application).

Figure 4A:
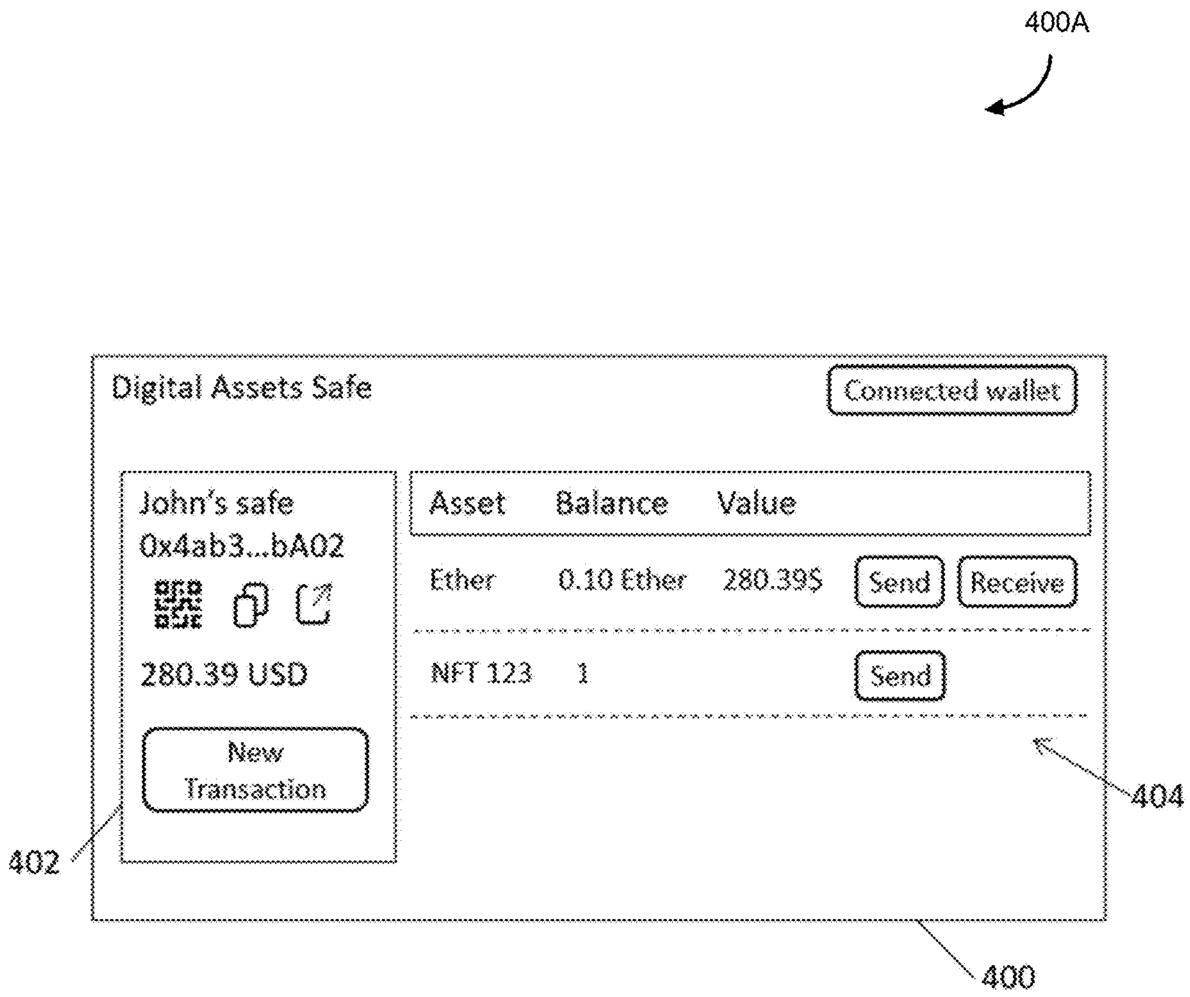
FIG. 4A-4C illustrate user interfaces for managing a multi-custody safe and performing transactions.

A simplified example screen interface 400 for the MCS management module is shown in FIG. 4A. The depicted interface allows management of a multi-custody safe once it has been created and includes a region 402 showing information about the safe, such as the name assigned to the safe, the safe address, and a current value of cryptocurrency assets held in the safe. Buttons may be provided for displaying a QR code of the address, copying the address to a system clipboard (to allow it to be pasted in another application), passing the address to an external application (e.g., user wallet) to allow creation of a transaction targeting the safe, and a "New transaction" button for creating a new outgoing transaction from the safe. A region 404 provides a list of any crypto assets currently held in the safe—in the present example, a quantity of "Ether" crypto currency is shown, along with an NFT "NFT 123". In practice, the safe can simultaneously hold many different types of crypto assets, including currencies and tokens (e.g., NFTs). Each asset may be associated with individual "send" and "receive" buttons (as appropriate) to create transactions specifically for that asset type.

The safe management interface may provide a variety of other functionality, such as: adding/replacing/removing owners; viewing a queue of pending transactions and/or history of completed transactions; an address book function that records past addresses used for transactions and/or allows the user to store addresses for use in transactions; setting a spending limit overall or in relation to particular assets; decentralized finance (DeFi) capabilities (e.g., DeFi insurance); setting up of recurring payments, standing orders or future timed transactions; and configuring notifications, e.g., to notify user of received or completed outgoing transactions.

Figure 4B:
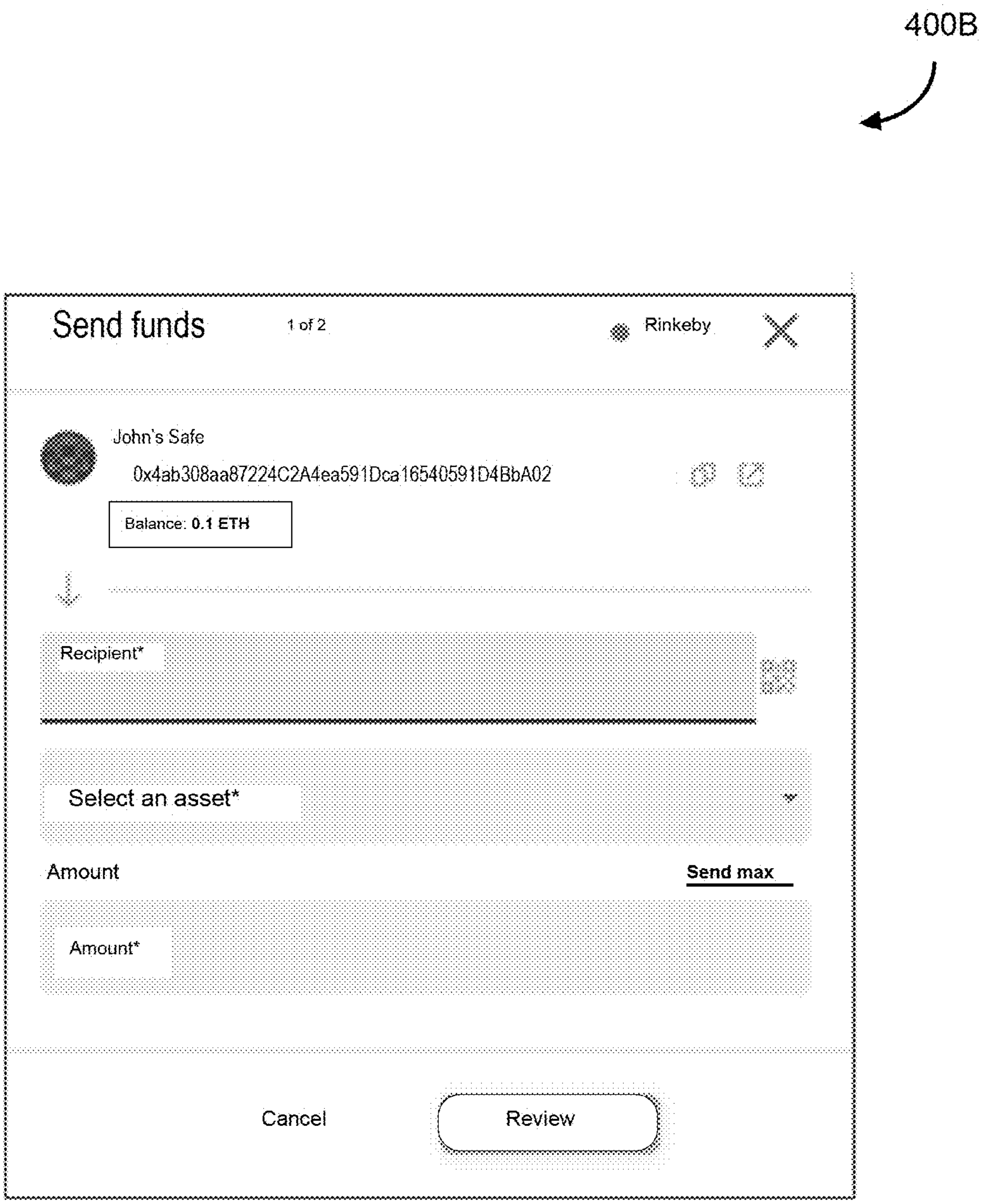

FIG. 4B shows an example user interface for initiating sending funds to a recipient. The interface includes the recipient address, asset to be sent, and the amount (in the case of a cryptocurrency e.g., Ether or a fungible token). In the case of a unitary asset (e.g., non-fungible token) no amount may be specified or the amount may default to 1.

Figure 4C:
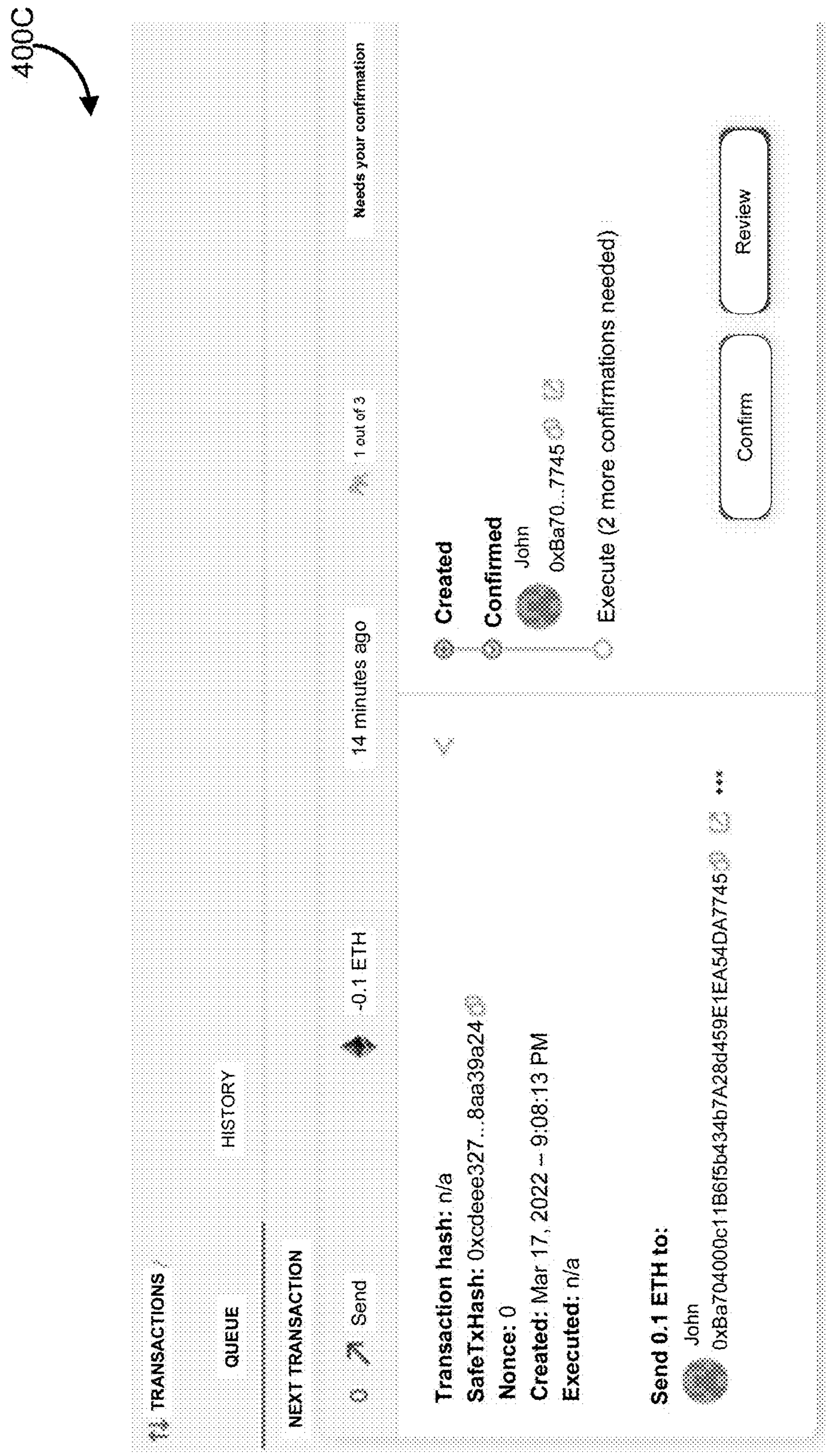

FIG. 4C shows an example user interface displaying transactions still waiting in the queue for the user or administrator to approve. For example, the system may display information such as sender, recipient, quantity, dates, transaction hashes etc. The system further displays the status of the transaction, indicating the transaction as pending and awaiting signature, and the total/still outstanding required number of signatures that need to be executed. Risk information may also be shown for review by the administrator user as discussed in more detail later.

Figure 5:
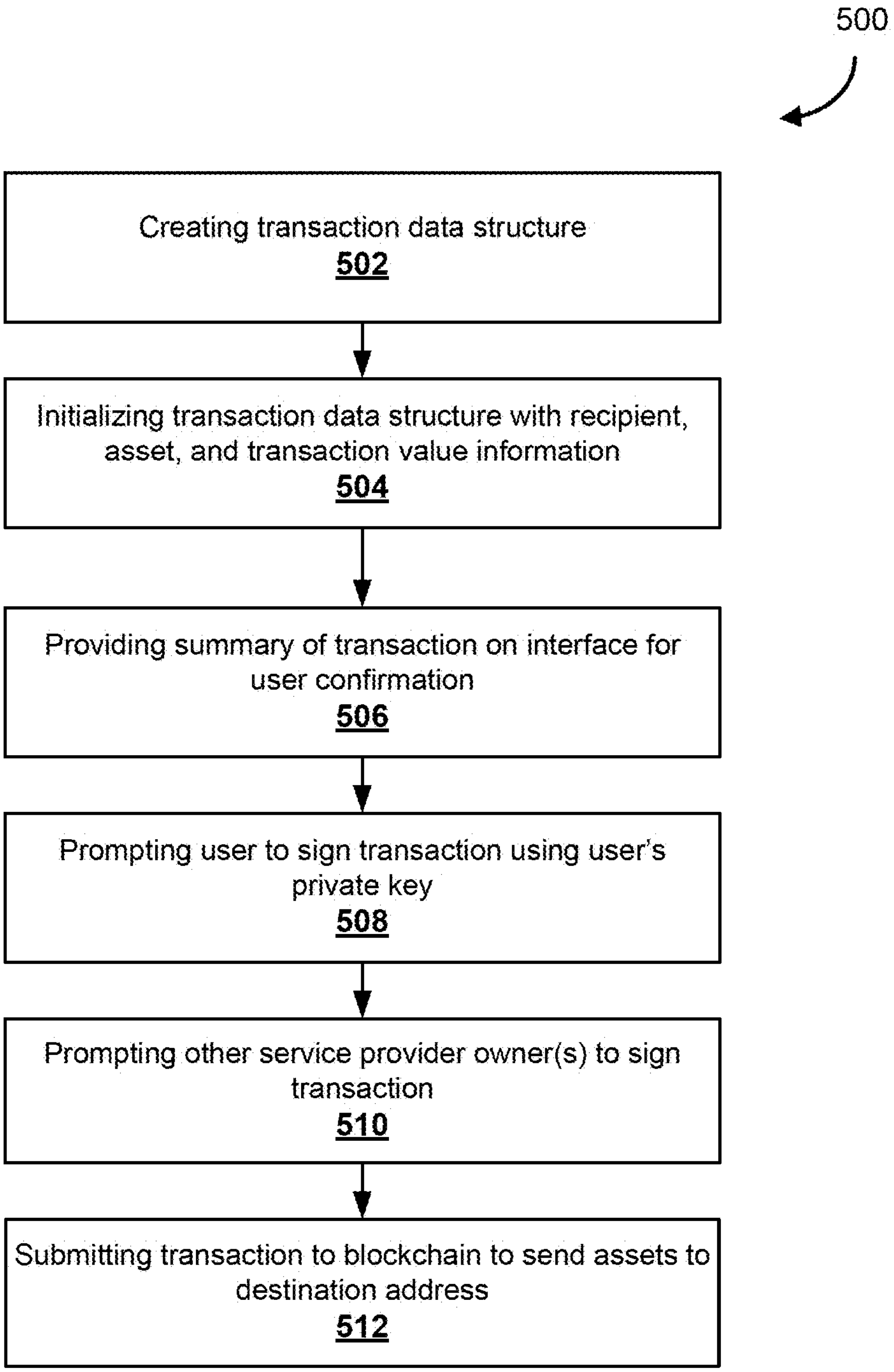
FIG. 5 illustrates a process for performing a transaction using a multi-custody safe.

FIG. 5 illustrates a process for creating a transaction for transferring cryptographic asset(s) from a multi-custody safe to a target address.

In step 502, the end user (user owner) submits a request to create a transaction, e.g., by clicking the "New transaction" button, which will create a corresponding transaction data structure. A newly created transaction is assigned a unique ID and saved to a map of transactions in which transactions are mapped by their unique ID. Each transaction data structure contains a destination address for the transaction funds, the value of the transaction funds, a flag to indicate execution status, and bytes to store data.

In step 504, the system initializes the transaction data structure by prompting the user to enter the required information for the transaction, such as the recipient to send the assets to, the assets to be sent, and the amount of assets to send, e.g., via an interface as illustrated in FIG. 4B.

In step 506, the system may present a summary of the transaction and ask the user to confirm submission of the transaction.

In step 508, the user is then prompted to sign the transaction. This may, for example, occur via the linked wallet in which case the interface may redirect the user to the wallet application to sign the transaction. The user will sign the transaction using the user's private key via linked wallet. However, transaction will only go through when minimum defined custodians have signed.

In step 510, once the user owner signature has been applied to the transaction, the system then prompts one or more of the service provider owners defined for the multi-custody safe to sign the transaction. The number of signatures to be obtained depends on the initial configuration of the safe. For example, if three provider owners were configured in addition to the user owner (as in the FIG. 2 example), with three out of the four owners required to sign a transaction, then after signature by the user owner, a further two signatures are needed for a valid transaction. Thus, the system obtains two additional signatures from provider owners.

More specifically, this requires signature with the given number of private keys held by the service provider, which in an embodiment are stored in corresponding service provider wallets configured for the safe during setup. Administrator users working for the service provider with access to those wallets can respond to the signature prompt to apply the necessary signatures to the transaction.

In an embodiment, the system may create a queue of pending transactions for administrators that are able to apply signatures using the provider owner private keys. In some embodiments, the keys are distributed system-wide across different administrative users, and this aspect can be controlled by the system. The system may also flag in an administrator user interface that there are transactions awaiting approval. An administrator working on behalf of the service provider can view the queue and the system displays information about the transaction, as e.g., illustrated in FIG. 4C.

The administrator can then confirm the transaction, in which case the administrator is prompted to sign the transaction using a relevant private key corresponding to one of the provider owners defined for the safe. Similar to the user owner signature, the signature may be applied using an external digital wallet module that stores the required private key.

If further signatures are required, the transaction remains in the queue for a further administrator to sign with a relevant owner key. The status of the transaction will be shown as requiring one or more additional signatures from additional administrator users. Alternatively, an administrator can choose to reject a transaction (e.g., for fraud prevention or other reasons), at which point the process ends and the transaction fails.

In step 512, once the necessary number of service provider owner signatures have been obtained (in addition to the user owner signature), the transaction is then submitted to the blockchain for processing. This may involve payment of any necessary transaction cost (e.g., "gas" in the case of the Ethereum blockchain). In an example, when applying the final service provider signature the administrator applying the signature is informed that the signature will result in the transaction being submitted and the gas cost (or other transaction cost) being debited from the signing user (e.g., from the Ether balance of the wallet address applying the final signature).

The system may provide an interface (e.g., a transaction history list) providing information on past/pending transactions, showing transaction detail and status, allowing the user to see whether a transaction is still awaiting one or more signatures or that the transaction has been successfully completed.

Figure 6:
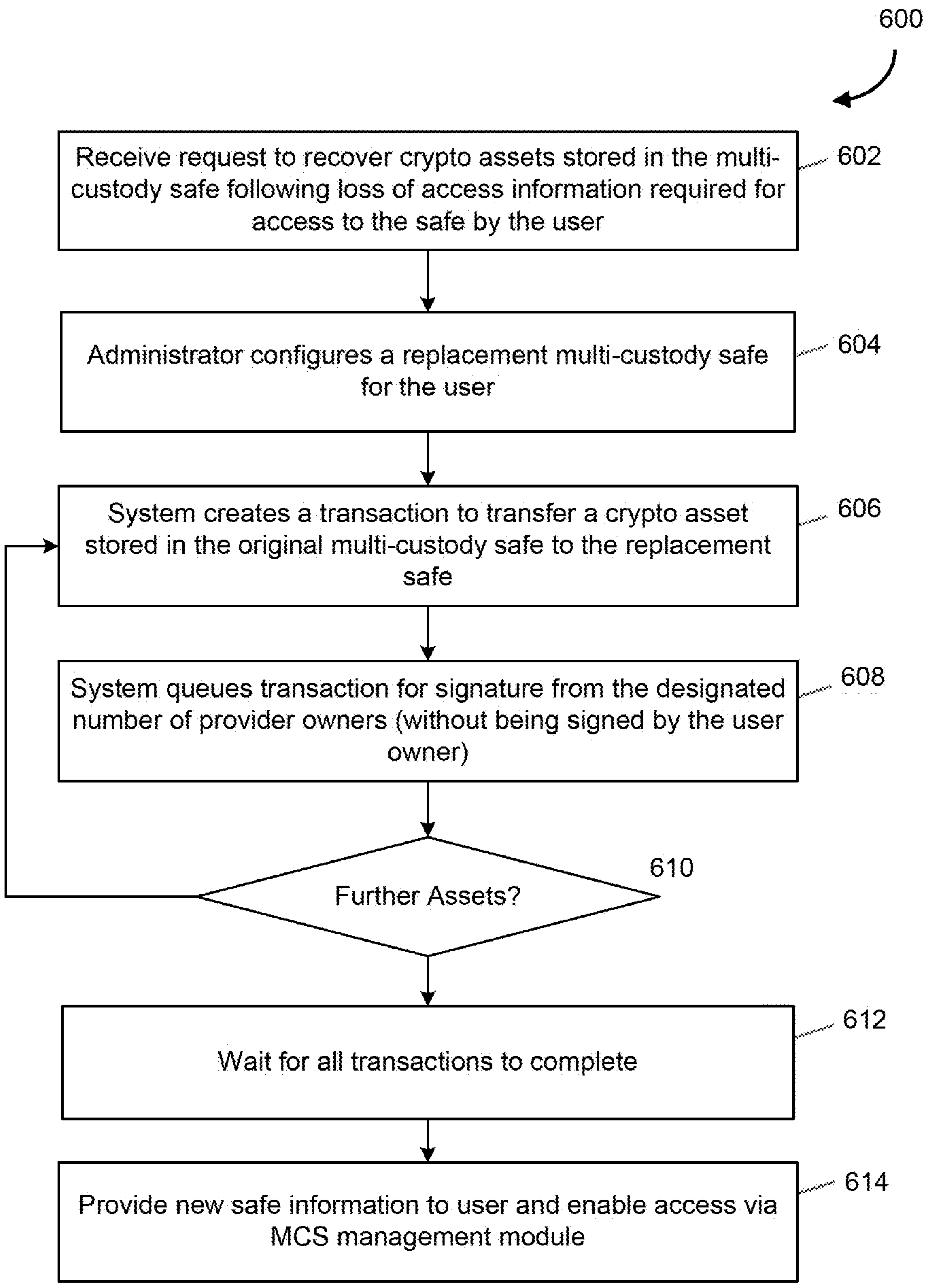
FIG. 6 illustrates a process for recovering assets stored in a multi-custody safe.

As discussed above, by providing multiple "owners" (corresponding to respective private keys) associated with the safe, including the actual user owner and one or more additional owners associated with the service provider (for which the service provider controls and has access to the relevant private keys)—recovery becomes possible in the event that the user owner loses access to the necessary credentials required for access to the safe. A recovery process is illustrated in FIG. 6.

The process assumes that the user has lost access to relevant credentials/information needed to access and use the multi-custody safe. For example, the user may have lost the private key itself (that is required for signing transactions from the safe), or a username, password, passphrase or other credentials required to access a wallet that stores the private key. In some embodiments, the user can recover digital assets through supported seed phrase recovery, similar to password recovery for internet banking in Web 2.0.

In step 602, the user submits a request to recover assets from the multi-custody safe. For example, this may be via a menu option provided in the MCS management module 114 (FIG. 1). The module can be a component of a user interface that is being rendered using a backend user interface engine for providing an internet banking portal, which is then coupled to command a corresponding operation to be invoked through an application programming interface to generate a control message to be sent to the smart contract on-chain.

The request is processed by an administrator user of the service provider. In step 604, the administrator configures a replacement multi-custody safe for the user, typically using the same configuration as used for the original safe (such as number of signatories) based on information stored in the database when the original safe was created. The creation may be performed automatically or under control of the administrator. As for the original safe, safe creation results in deployment of a smart contract implementing the new multi-custody safe to the blockchain. The replacement multi-custody safe is identified by a new safe address on the blockchain.

In step 606, the system then creates a transaction for each asset stored in the original multi-custody safe, to transfer the asset from the original safe to the replacement safe at the new safe address. While these transactions could be configured manually by the administrator, in preferred embodiments, the system may create the transactions automatically, one for each asset stored in the original safe.

As before, each transaction requires the specified number of owners to sign with their private key, but that number is at least one less than the total number of owners. Thus, the transaction can be successfully completed using only m out of n signatories (where m<n), meaning that signature by the user owner—who is unable to sign due to loss of the relevant credentials—is not needed. Instead, the system submits the transaction to be signed by the relevant number of provider owners (i.e. corresponding to private keys managed by the service provider). As for a regular transaction, at step 608, the transaction is placed in a pending queue for signature by the relevant administrator users that have access to the required private keys. In this case, due to the transaction not being signed by the owner user, one additional provider owner signature is needed. In the FIG. 2 example, where three out of four signatures are required for a valid transaction, all three provider owners 222-224 are required to sign the transaction.

The process then determines (step 610) whether further assets are stored in the original safe and continues to create the necessary transactions for transferring each asset to the replacement safe and queuing the transactions for signing (loop 606-610).

Once all assets have been processed, the process then waits for all transactions to complete (step 612). This requires, for each transaction, signing of the transaction by the requisite number of provider owner private keys, at which point the transaction is then submitted to the blockchain. Once all transactions have completed, all assets that were stored in the original safe will have been moved from the original safe to the replacement safe. At this point the information (e.g., address etc.) for the new safe is provided to the end user (614), and access to the safe via the MCS management module is enabled. The original safe may be deleted or marked as disabled in the database, preventing future access to the original safe in the MCS management module. The user can then continue to use the replacement safe to manage the stored digital assets and perform transactions in relation to those assets, whilst new assets may be received at the new safe address assigned to the replacement safe.

Thus, by providing a multi-custody safe, arranged such that the end user has access to one of the private keys, whilst one or more further private keys are under the control of the service provider system (and its administrator users), recovery of assets in a safe becomes possible even where the user loses the information (e.g., credentials) necessary to access the safe and sign transactions.

The requirement for transactions to be signed by multiple keys also provides for a check on transactions being carried out. The staged, manual approval flow can prevent errors before a transfer takes place (e.g., and administrator can intervene by querying or denying a transaction if the user inadvertently provides the wrong target address for a transfer, or attempts an unusually large transfer).

Additionally, the multi-custody safe enables implementation of risk controls. In preferred embodiments, the system provides risk management tools that enable administrators to scan safes for fraud and sanctions, limit transfers, and/or audit transaction chains. Risk controls can include controls implemented directly in the MCS smart contract, as well as risk management functions implemented by the service provider system.

As an example of risk controls implemented in the MCS smart contact, the smart contract may be configured to reject transactions or flag transactions in dependence on certain risk criteria. These may be configured (e.g., by the end user or service provider) when setting up a new safe, or at some later point. Risk criteria could include the transaction source, transaction destination, and/or transaction value (e.g., a cryptocurrency value or equivalent fiat currency value of an asset). For example, one or more transaction value thresholds or bands could be configured, with the smart contract comparing the transaction value to defined value thresholds or bands, and processing the transaction accordingly—e.g., by associating a risk label or category with a transaction or determining whether to reject a transaction if the transaction value meets a certain threshold or fall within a certain band.

Risk controls may also include whitelists or blacklists restricting transactions to or from certain transaction sources or destinations (where sources/destinations are typically defined in terms of blockchain addresses).

Some concrete examples of risk controls that may be implemented include:

Limiting value amount to send or receive: The system may apply limits to a multi-custody safe to limit transaction values that may be sent from, or received by a safe. For sending transactions, the system may reject attempts to create transactions exceeding a defined limit. Limits may be configured by the MCS smart contract and may be enforced by the MCS smart contract not accepting transactions exceeding the relevant limit. For receive transactions, the MCS smart contract may reject transactions attempting to transfer in excess of the limit value to the safe, causing the transaction to fail. For send transactions, the MCS smart contract may decline to process transactions exceeding the limit. Individual limits may be specified for different assets/asset types in the safe.

Blacklist wallets/addresses to send or receive: The system may allow definition of a blacklist of addresses or wallets to which transactions may not be sent from the multi-custody safe or from which transactions may not be received. Blacklists may be stored at and enforced by the MCS smart contract. Such transactions would fail/be rejected in a similar manner to the limit-based controls discussed above.

Whitelist addresses/wallets to send or receive: The system may allow definition of a whitelist of addresses or wallets to which assets may be transferred in a transaction or from which assets may be received. In this case, all other transaction involving non-whitelisted addresses may be rejected as discussed above, or alternatively such transactions may be flagged for review/additional approval. The whitelist(s) may be stored in and enforced by the MCS smart contract.

Flagging high-risk transactions or safes—The system may flag if a MCS has been involved in a transaction chain involving a known fraudulent address/wallet. Fraudulent safes may be tagged for cybercrime, fund theft, ransomware, darknet activities, terrorist financing, money laundering, illicit content, sanctions, data breaches and other reasons.

Transactions involving such safes may be rejected, or flagged for further review/approval.

Benchmark safe activity to similar multi-custody safes: The system can monitor usage statistics, for example monthly average flows, typical ranges of transfer amounts, time between transactions, durations a safe is active vs. dormant (e.g., number of months) and the like. Such statistics may be compared to other multi-custody safes in the system to detect abnormal usage patterns.

The system can additionally track when a multi-custody safe underwent checks by regulated entities (e.g., established brokers).

Other tracking and monitoring functions the system may implement can include: an ability to detect what funds were used for—e.g., gambling or decentralized finance (DeFi) services such as lending; an ability to detect when funds are sent to mixers/anonymisers; and an ability to pin an IP Address to a multi-custody safe—revealing location and enabling correlation with identify-revealing services on the same IP address, e.g., to identify an end user associated with a multi-custody safe involved in fraudulent activity.

In an embodiment, the system evaluates a risk metric for a multi-custody safe and/or a specific transaction involving the safe based on some combination of risk factors (e.g., selected from those discussed above or others) and computes a risk classification for the transaction (e.g., low/medium/high). When a transaction is presented for approval to (and signature by) an administrator, the risk classification (or metric) is displayed and the administrator can use that information in deciding whether to approve the transaction, reject the transaction, or refer it for further review. Administrators can also consult the transaction log of past transactions for a particular multi-custody safe for risk information, e.g., to identify high-risk transactions.

In an embodiment, the system provides functionality for performing a risk check for any multi-custody safe. This can involve analysing past transactions made using the safe, e.g., based on some or all of the criteria discussed above and/or others, to determine various information about the safe and its transactions. The risk assessment can produce, for example, an indication whether the multi-custody safe (and related entities) are compliant and/or associated with risk, and may assign an overall risk rating (e.g., low/medium/high).

Figure 7:
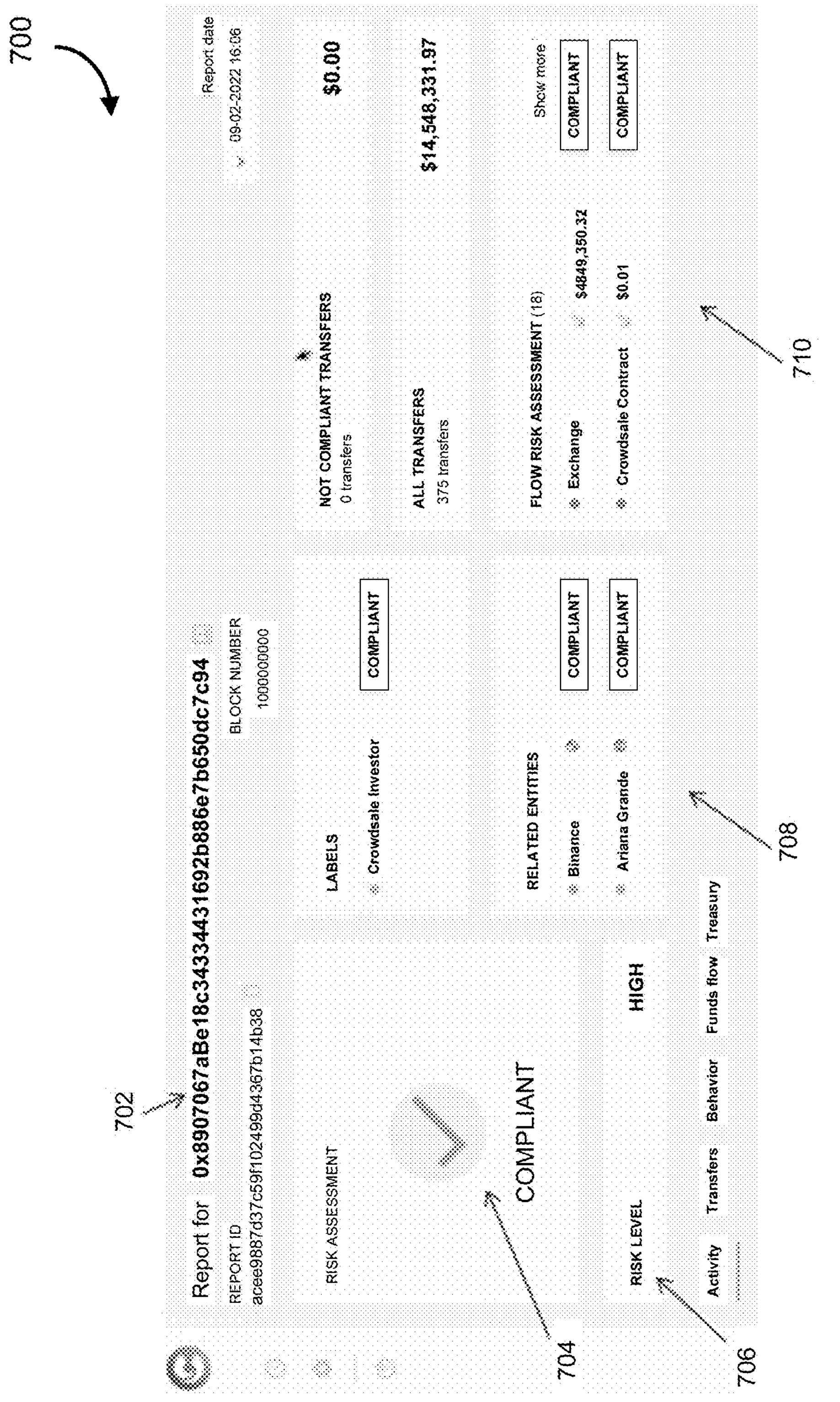
FIG. 7 illustrates a risk assessment for a multi-custody safe.

An example risk report for a multi-custody safe is shown in FIG. 7, which identifies the address 702 of the multi-custody safe to which the report relates and provides a compliance rating 704 and a risk level rating 706. For example, government agencies can maintain a list of black-listed wallets. Compliance is ensuring no transaction (send/receive) is allowed to such wallets ids. Compliance and/or risk information 708 for certain labels and related entities is also shown. Additionally, transaction flow information is shown (710), for example the total amount (in equivalent fiat currency value) of transactions flagged as non-compliant (here zero), the total transaction value for all transactions, and total transaction flows and compliance for different transaction types/classes. The report may be generated for a particular time window (e.g., the last month or year), or for all transactions since creation of the safe.

Figure 8:
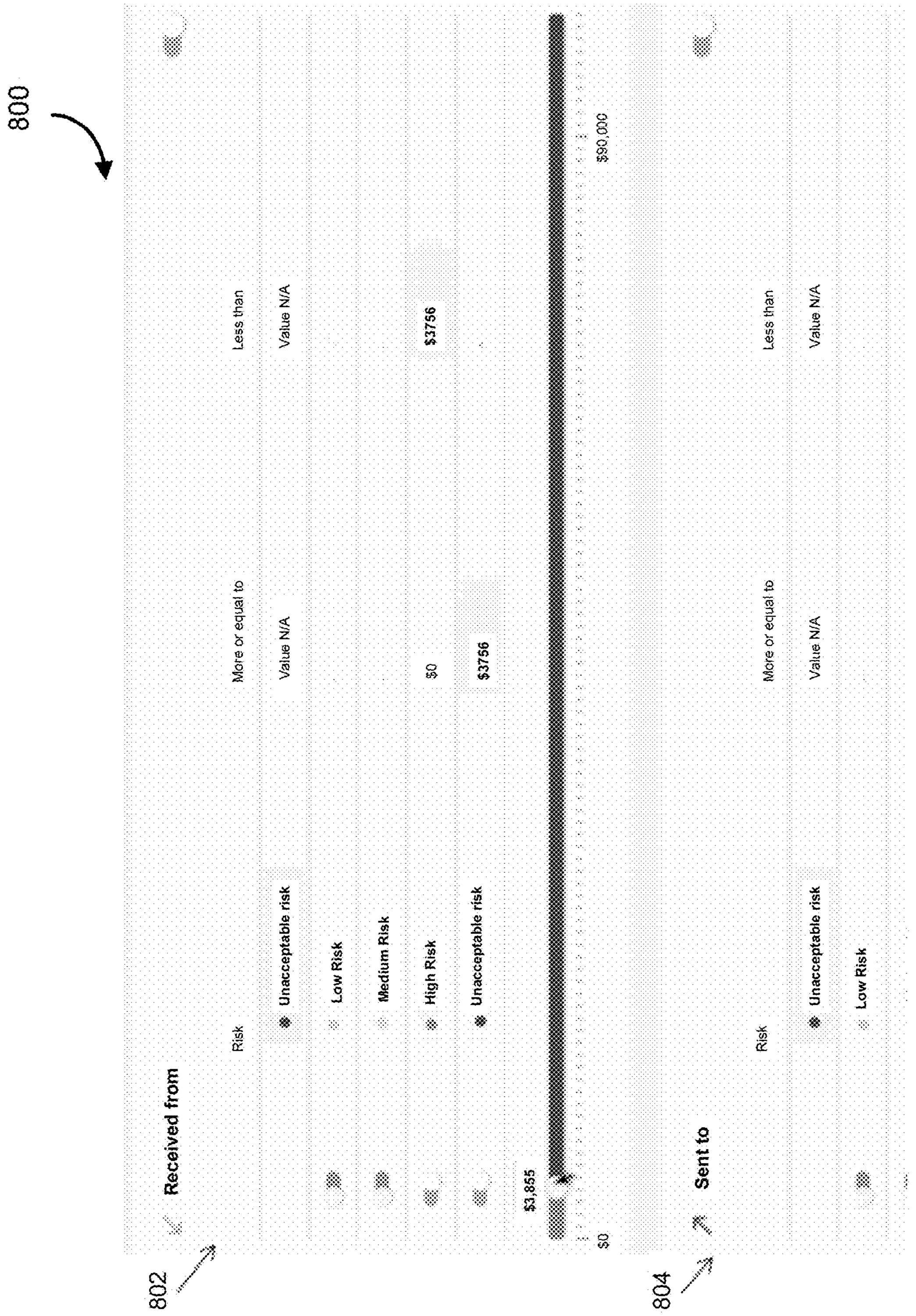
FIG. 8 illustrates a user interface for configuring risk controls.

In a preferred embodiment, system administrators may also flexibly configure risk controls applied to a multi-custody safe. FIG. 8 shows an example screen display for a configuration interface, which allows risk controls to be configured separately for incoming transactions 802 (assets being received by the multi-custody safe) and outgoing transactions 804 (assets being sent from the multi-custody safe). In each case, the interface displays the available risk classes (e.g., low/medium/high/unacceptable) and provides individual options to activate/deactivate risk controls for the class and set lower/upper transaction value limits relevant to the risk class.

Additionally, administrators may configure certain transaction types as associated with particular risk classes. For example, transactions identified (e.g., due to immediate source/destination addresses, or due to relevant addresses found in extended transaction chains), as possibly related to cybercrimes or other undesired activity can be automatically flagged as "unacceptable risk". Examples can include cyber-crime, intrusion/data breach, funds theft, ransomware, dark-net markets, terrorist financing, money laundering, illicit content, sanctions and the like.

The system may also provide dashboards for viewing and summarizing risk information relating to transaction trails, or individual or groups of multi-custody wallets. For example, the system can display one or more of: a network graph of transactions to a multi-custody wallet, showing different transactions sources colour-coded according to risk; graphs summarizing transaction values in different risk categories or other metrics; and an analysis of a comparison of the multi-custody safe to other safes according to various metrics such as activity duration, average time between sent or received transactions, monthly transaction value received/sent, number of assets used, average transaction values etc.

Figure 9A:
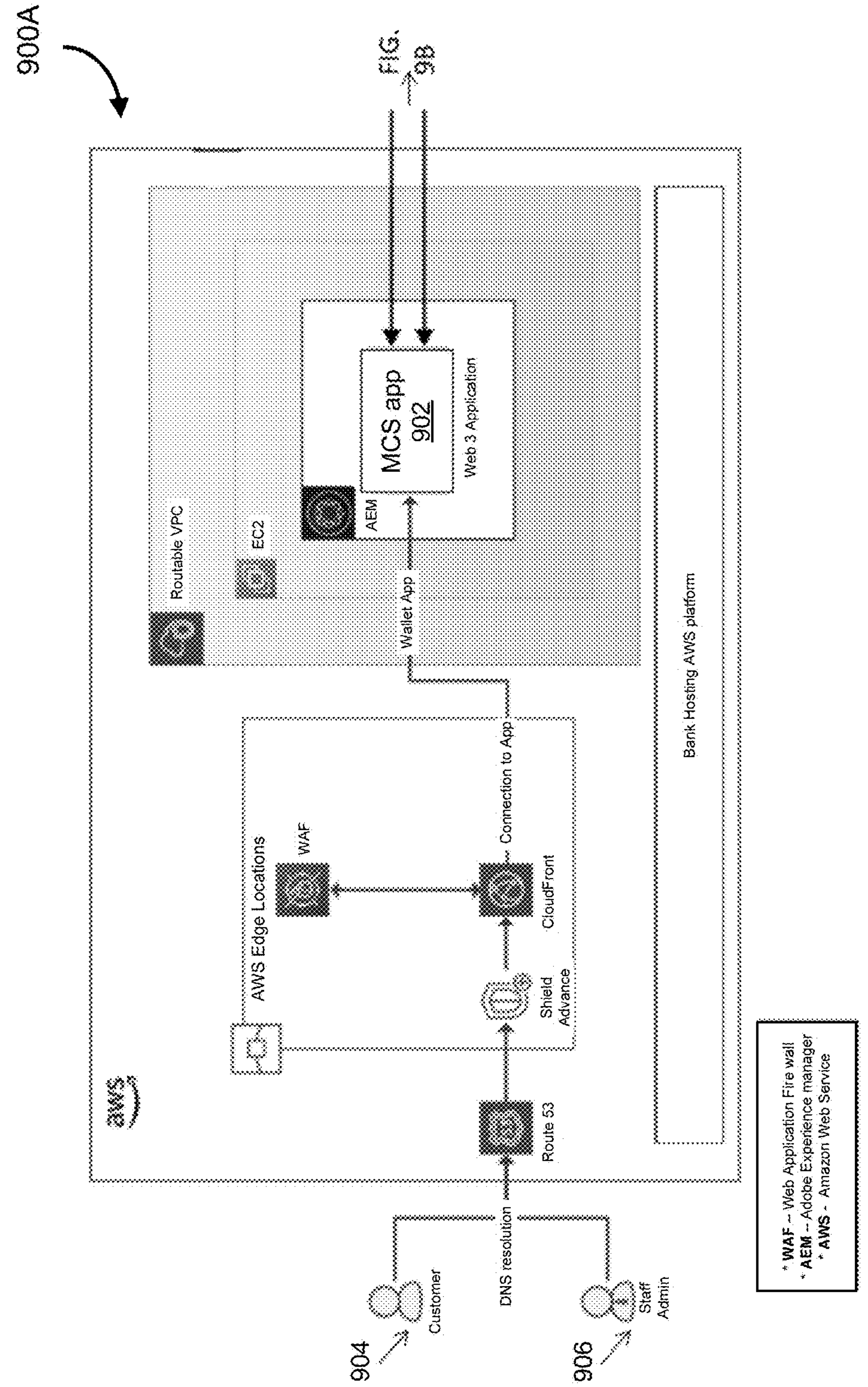
FIGS. 9A, 9B illustrate a software architecture for a cloud-based implementation of the proposed system.
Figure 9B:
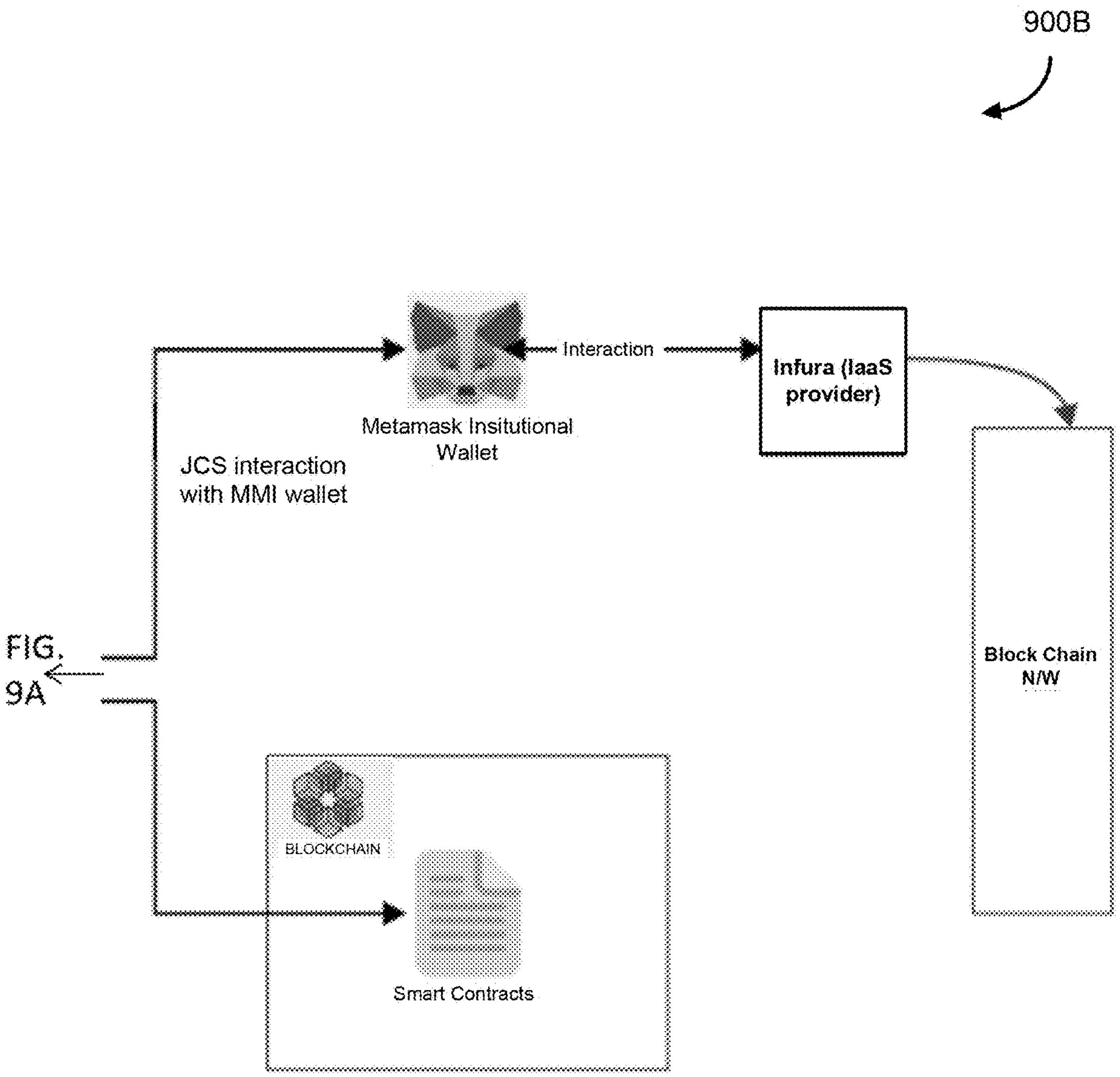

FIG. 9A and FIG. 9B illustrate a software architecture for an example implementation of the described system. As shown in FIG. 9A, the multi-custody safe (MCS) application 902 (e.g., corresponding to MCS management module 114 of FIG. 1) is here provided as an application implemented using Adobe Experience Manager (AEM), hosted on an Amazon EC2 server platform in a virtual private cloud (VPC) within Amazon Web Services.

Access to the application by end users 904 and the service providers' administrator users 906 is mediated via a Cloudfront content delivery platform and security features such as an AWS web application firewall (WAF) and AWS Shield protection function. FIG. 9B illustrates communication between the MCS applications and one or more wallets, here implemented using Metamask Institutional wallets, for storing the service provider keys and with the blockchain for deployment of the MCS smart contracts. The MCS can be implemented using the banking institution's own in-house wallets or wallets provided by external institutions. An example embodiment uses Rinkeby as a blockchain test network for development and testing and Ethereum as the production blockchain network.

The multi-custody safe itself may be implemented on the basis of the Gnosis safe technology (e.g., for SDK, UI and safe features, and APIs for transactional data).

Figure 10:
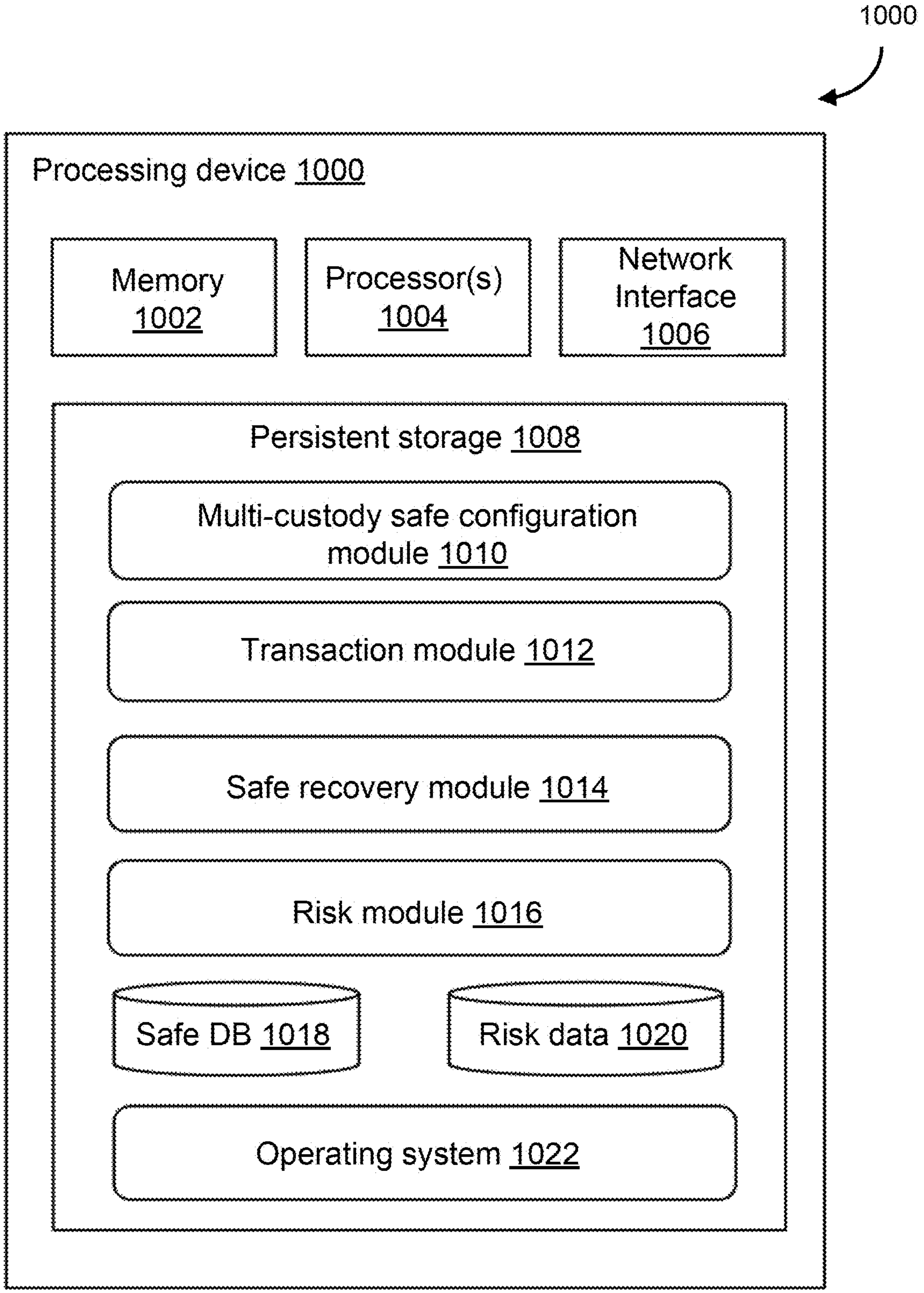
FIG. 10 illustrates a processing device for implementing described techniques.

FIG. 10 illustrates a processing device for implementing functions of the described system, for example aspects of the MCS management module 114 of FIG. 1.

The processing device 1000 may be based on conventional server hardware and as such includes one or more processors 1004 together with volatile/random access memory 1002 for storing temporary data and software code being executed.

A network interface 1006 is provided for communication with other system components, such as user devices, administrator devices, internet banking backend systems, and blockchain nodes. Communication may occur over one or more networks (e.g., Local and/or Wide Area Networks, including private networks and/or public networks such as the Internet). In an embodiment, the processing device 1000 may itself operate as a blockchain node of the blockchain network.

Persistent storage 1008 (e.g., in the form of hard disk storage, optical storage and the like) persistently stores software and data for performing various described functions. In an example, this includes an MCS configuration module 1010 for configuring a new safe for a user and deploying it to the blockchain (e.g., as per the FIG. 3 process), a transaction module 1012 for setting up and carrying out new transactions for transferring assets from a safe to a target address on the blockchain (e.g., as per the FIG. 5 process), a safe recovery module 1014 for recovering a safe (e.g., as per the FIG. 6 process) following loss of user access credentials, and a risk control and monitoring module 1016 for configuring risk controls and performing risk assessments for safes/transactions.

The persistent storage further includes stored information used by the above processes, such as a database of multi-custody safes 1018 storing safe and associated user information, and risk data 1020 generated by the risk control/monitoring module 1016. Other information used by the system (e.g., smart contract code used to deploy safes to the blockchain) may also be stored.

The persistent storage further includes a computer operating system 1022 and any other software and data needed for operating the processing device. The device will include other conventional hardware components as known to those skilled in the art, and the components are interconnected by one or more data buses (e.g., a memory bus and I/O bus).

While a specific architecture is shown and described by way of example, any appropriate hardware/software architecture may be employed to implement the described system.

Furthermore, the various functions may be performed by a single device 1000 or may be distributed across multiple devices (e.g., as a cluster of servers for load balancing, or using dedicated servers for different functions). As a concrete example, risk control and monitoring module 1016 could be implemented on a separate computing device in communication with processing device 1000 via the network.

Figure 11:
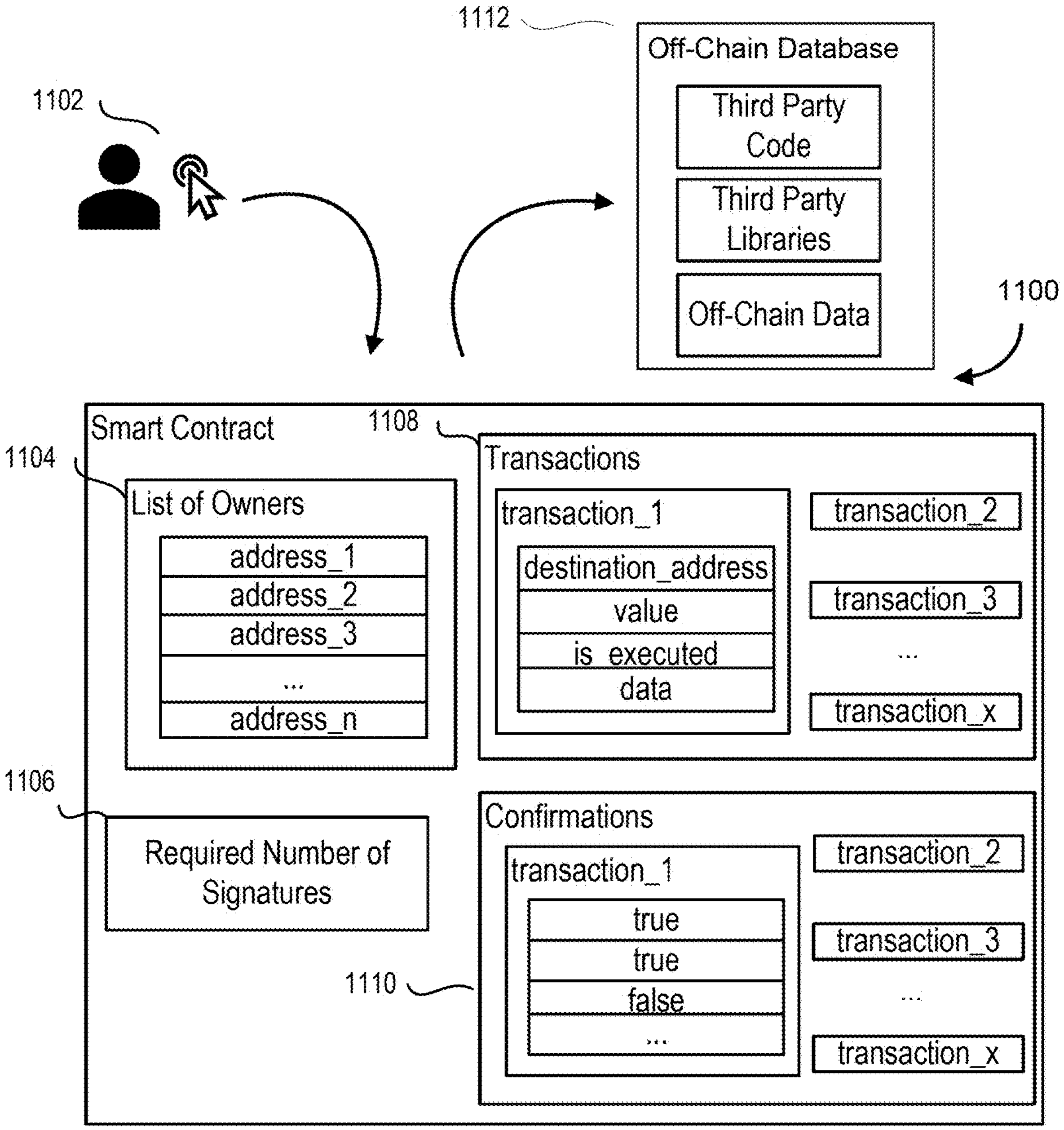
FIG. 11 is a block schematic diagram of an example multiple-signature joint custody safe smart contract, according to some embodiments.

FIG. 11 is a block schematic diagram of an example multiple-signature joint custody safe smart contract 1100, according to some embodiments.

The multiple-signature joint custody safe is configured to spawn multiple-signature joint custody safe smart contract data objects 1100 when interacted with by an authorized Web 2.0 online banking instance to generate a new safe for a user of the Web 2.0 online banking instance. The multiple-signature joint custody safe smart contract 1100 is configured to receive a request 1102 to generate a new multiple-signature joint custody safe for the user. Upon generation, a new multiple-signature joint custody safe smart contract 1100 is generated as described above, and shown in an example data structure architecture of FIG. 11.

The multiple-signature joint custody safe is implemented in source code and functions stored as a smart contract data object that persists on a Turing Complete capable distributed ledger/blockchain network, such as the Ethereum Virtual Machine. The specific code of the multiple-signature joint custody safe can be publicly available and operating as persistent code on the blockchain network, in some embodiments, configured for paying for computation "gas" fees using digital assets stored thereon using a special wallet for operating costs. The multiple-signature joint custody safe is configured to operate using multiple signatures, and spawns a new public/private key pair corresponding to the user that can be used as one of the multiple signatory addresses to conduct a transaction. The other signatory addresses can include a combination of addresses associated with automated and semi-automated approver computer system entities.

The multiple-signature joint custody safe smart contract 1100 is initialized with a list of owners 1104 and the required number of signatures 1106. The list of owners can be implemented in source code using a list of addresses.

A transaction submission occurs when an owner submits a new transaction, which is assigned a unique ID and saved to a map of transactions 1108 in which transactions are mapped by their unique ID. Each transaction is a data structure comprised of an address for the destination of the transaction funds, an integer variable for the value of the transaction funds, a Boolean flag to indicate execution status, and bytes to store data. In the process of creating and submitting a new transaction, the source code performs multiple checks: whether the user is a wallet owner, whether the transaction is valid, whether the transaction has not been executed, and whether the transaction is confirmed by the user.

Owners can confirm a transaction using an implemented function. The wallet checks that the owner has not confirmed the same transaction before. Each confirmation can be saved to a mapping of confirmations 1110 for each transaction, mapped as Booleans to track which confirmations have been received for the transaction. A transaction can be executed if it has the required number of confirmations. The source code of the multiple-signature joint custody safe smart contract checks if a transaction is confirmed by the required number of owners 1106 before allowing the confirmation to go through. The source code of the multiple-signature joint custody safe smart contract also safe checks if the customer has set any threshold limits before transferring the specified value and executing the data. Off-chain data (e.g., transaction amount limits and transaction frequency as defined by the customer/user) may be referred to in the smart contract via oracles to obtain the threshold limit from an off-chain database 1112 into the on-chain smart contract. If a threshold limit has been set, a check to confirm if a transaction falls within the transaction amount limit will also apply.

If all checks have passed, then the confirmed transaction will be executed and the specified value will be transferred to the destination address by calling it with the provided data. If necessary, owners can revoke their confirmations before the transaction is executed.

In some embodiments, upon generation, the multiple-signature joint custody safe is also provided and incorporates a pointer to a KYC data object token that was generated by the authorized Web 2.0 online banking instance as an additional proof associated with the user, the KYC data object token being verifiable by a automated approver computer system. The multiple-signature joint custody safe can be configured with either a fixed or variable number of signed approver messages before proceeding with a transaction. When new digital assets are transferred to a receiving address of the multiple-signature joint custody safe, the digital assets are transitioned to a high security, high availability wallet address. For example, a user is able to "deposit" the user's digital assets into this wallet address for safekeeping using the multiple-signature joint custody safe. On the user's online banking application, the user may be able to traverse the coupled multiple-signature joint custody safe to observe that the assets were transferred correctly.

Information and signals may be represented using different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

The functional blocks and modules described herein may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a processor, a digital signal processor (DSP), an ASIC), a field programmable gate array (FPGA) or other programmable logic device, discrete gate or transistor logic, discrete hardware components, or combinations thereof designed to perform the functions described herein. A processor may be a microprocessor, but in the alternative, the processor may be another form of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a computer, or a processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A computer-implemented system configured for interoperability between a centralized computing system for joint custodial secure storage of digital assets and an automated smart contract data structure deployed and persisted on a distributed ledger of a decentralized computing system, the system comprising:

a computer processor coupled to non-transitory computer memory, the computer processor configured to:

receive a user's request to create a safe data object on the distributed ledger of the decentralized computing system for storage of the user's assets;

instantiate the automated smart contract data structure deployed on the distributed ledger for managing digital assets, the automated smart contract data structure comprising a list of pointers referencing a plurality of addresses, a mapping of transactions, a mapping of confirmations, and a user-configured number of required owner signatures for the transactions, each of the addresses corresponding to an owner of a plurality of owners, the owners including a user owner corresponding to the user and one or more provider owners associated with the centralized computing system, each of the required owner signatures comprising a digital signature created by the private key corresponding to each of the required owners, the automated smart contract data structure coupled to an off-chain database through one or more pointers, the off-chain database storing a set of amount thresholds used to configure variable signature requirements for transactions exceeding the amount thresholds;

generate a private key for each owner;

store the private key of each owner in a digital asset wallet associated with the owner;

configure risk controls in the automated smart contract data structure for the transactions;

provide an address of the safe data object to the user for receiving deposits;

receive a transfer of a digital asset by the user addressed to the address of the safe data object;

receive a request from the user to initiate a transaction of a digital asset from the safe data object to a target recipient at a target address, the transaction being added to the mapping of transactions;

prompt each of the required owners to apply a digital signature to the transaction using the private key corresponding to each of the required owners;

store a signature collected from each of the required owners in the mapping of confirmations;

confirm the mapping of confirmations contains all of the required owner signatures; and upon confirmation of the required owner signatures, transfer the digital asset to the target address.

2. The computer-implemented system of claim 1, wherein the automated smart contract data structure is coupled to an off-chain database through one or more pointers referring to configurable off-chain computational addresses of the off-chain database, the off-chain database comprising at least one data record having data fields to store a set of amount thresholds, wherein each amount threshold is used to configure a variable signature requirement for a transaction of an amount higher than the amount threshold, wherein the set of amount thresholds can be dynamically modified by the user through the centralized computing system.

3. The computer-implemented system of claim 1, wherein the computer processor is further configured to:
upon a private key becoming inaccessible, configure, using the centralized computing system, a replacement safe data object for the user; and
transfer at least one digital asset stored in the safe data object to the replacement safe data object using at least one transaction, wherein the at least one transaction is signed by the required owners defined for the automated smart contract data structure.

4. The computer-implemented system of claim 1, wherein the computer processor is further configured to:
generate, using the centralized computing system, a signed data object token for the user to approve the transaction, the signed data object token residing on one of a server backend of the centralized computing system, the user's device, or a distributed ledger as a data payload; and
incorporate a pointer to the signed data object token, wherein the signed data object token is configured for verification by an automated approver computing system, wherein the automated approver computing system comprises automated approval agents that are configured to generate an automated signed approval message based on validation of at least one of the user's signed data object token and a target recipient's signed data object token.

5. The computer-implemented system of claim 1, wherein the computer processor is further configured to:
pay for computation gas costs using the user's assets stored at the safe data object; and
monitor computation gas costs produced by the user's transactions.

6. The computer-implemented system of claim 1, wherein the computer processor is further configured for seed phrase recovery to enable the user to access and recover at least one digital asset stored at the safe data object by re-generating a new safe data object having a new public/private key pair that is provided to the user upon obtaining signed data object tokens from each of the other required owners.

7. The computer-implemented system of claim 1, wherein the risk controls comprise at least one of:
a source address whitelist, the automated smart contract data structure configured to reject a transaction from an address not included in the whitelist;
a source address blacklist, the automated smart contract data structure configured to reject a transaction from an address included in the blacklist;
a destination address whitelist, the automated smart contract data structure configured to reject a transaction addressed to an address not included in the whitelist;
a destination address blacklist, the automated smart contract data structure configured to reject a transaction addressed to an address included in the blacklist; and
a set of transaction value bands, the automated smart contract data structure configured to reject a transaction depending on a comparison of the value of the transaction to the set of transaction value bands.

8. The computer-implemented system of claim 1, wherein the centralized computing system is configured to provide access to an internet application hosted by the centralized computing system for the user to access at least one bank account, wherein a safe data object management interface is integrated into the internet application to allow the user to access the safe data object using application programming interfaces coupling the internet application and the safe data object, the application programming interfaces including programmatic computing calls to a node hosting the distributed ledger of a decentralized computing system, the programmatic computing calls instructing and confirming state change instructions to be transmitted to the distributed ledger of a decentralized computing system corresponding to state changes of the safe data object.

9. The computer-implemented system of claim 1, wherein the owners comprise:
a user owner corresponding to the requesting user, and
one or more provider owners associated with the centralized computing system.

10. The computer-implemented system of claim 1, wherein the user is prompted to sign the transaction from the safe data object via the user's associated digital wallet, wherein the prompting comprises invoking cryptographic wallet software managing the user's associated digital wallet to obtain a signature using the private key stored in the user's associated digital wallet.

11. A computer-implemented method for electronically coupling a centralized computing system for joint custodial secure storage of digital assets, with an automated smart contract data structure deployed and persisted on a distributed ledger of a decentralized computing system, the method comprising:
receiving a user's request to create a safe data object on the distributed ledger of the decentralized computing system for storage of the user's assets;
instantiating the automated smart contract data structure deployed on the distributed ledger for managing digital assets, the automated smart contract data structure comprising a list of pointers referencing a plurality of addresses, a mapping of transactions, a mapping of confirmations, and a user-configured number of required owner signatures for the transactions, each of the addresses corresponding to an owner of a plurality of owners, the owners including a user owner corresponding to the user and one or more provider owners associated with the centralized computing system, each of the required owner signatures comprising a digital signature created by the private key corresponding to each of the required owners, the automated smart contract data structure coupled to an off-chain database through one or more pointers, the off-chain database storing a set of amount thresholds used to configure variable signature requirements for transactions exceeding the amount thresholds;
generating a private key for each owner;
storing the private key of each owner in a digital asset wallet associated with the owner;
configuring risk controls in the automated smart contract data structure for the transactions;
providing an address of the safe data object to the user for depositing;
receiving a transfer of a digital asset by the user addressed to the address of the safe data object;
receiving a request from the user to initiate a transaction of a digital asset from the safe data object to a target recipient at a target address, the transaction being added to the mapping of transactions;
prompting each of the required owners to apply a digital signature to the transaction using the private key corresponding to each of the required owners;
storing a signature collected from each of the required owners in the mapping of confirmations;
confirming the mapping of confirmations contains all of the required owner signatures; and upon confirmation of the required owner signatures, transferring the digital asset to the target address.

12. The computer-implemented method of claim 11, wherein the automated smart contract data structure is coupled to an off-chain database through one or more pointers referring to configurable off-chain computational addresses of the off-chain database, the off-chain database comprising at least one data record having data fields to store a set of amount thresholds, wherein each amount threshold is used to configure a variable signature requirement for a transaction of an amount higher than the amount threshold, wherein the set of amount thresholds can be dynamically modified by the user through the centralized computing system.

13. The computer-implemented method of claim 11, further comprising:

upon a private key becoming inaccessible, configure, using the centralized computing system, a replacement safe data object for the user; and transferring at least one digital asset stored in the safe data object to the replacement safe data object using at least one transaction, wherein the at least one transaction is signed by the required owners defined for the automated smart contract data structure.

14. The computer-implemented method of claim 11, further comprising:

generating, using the centralized computing system, a signed data object token for the user to approve the transaction, the signed data object token residing on one of a server backend of the centralized computing system, the user's device, or a distributed ledger as a data payload; and incorporating a pointer to the signed data object token, wherein the signed data object token is configured for verification by an automated approver computing system, wherein the automated approver computing system comprises automated approval agents that are configured to generate an automated signed approval message based on validation of at least one of the user's signed data object token and a target recipient's signed data object token.

15. The computer-implemented method of claim 11, further comprising:

incurring for computation gas costs using the user's assets stored at the safe data object; and monitoring computation gas costs produced by the user's transactions.

16. The computer-implemented method of claim 11, further comprising recovering at least one digital asset stored at the safe data object by re-generating a new safe data object having a new public/private key pair that is provided to the user upon obtaining signed data object tokens from each of the other required owners.

17. The computer-implemented method of claim 11, wherein the risk controls comprise at least one of:

a source address whitelist, the automated smart contract data structure configured to reject a transaction from an address not included in the whitelist;

a source address blacklist, the automated smart contract data structure configured to reject a transaction from an address included in the blacklist;

a destination address whitelist, the automated smart contract data structure configured to reject a transaction addressed to an address not included in the whitelist;

a destination address blacklist, the automated smart contract data structure configured to reject a transaction addressed to an address included in the blacklist; and a set of transaction value bands, the automated smart contract data structure configured to reject a transaction depending on a comparison of the value of the transaction to the set of transaction value bands.

18. The computer-implemented method of claim 11, wherein the centralized computing system is configured to provide access to an internet application hosted by the centralized computing system for the user to access at least one bank account, wherein a safe data object management interface is integrated into the internet application to allow the user to access the safe data object using application programming interfaces coupling the internet application and the safe data object, the application programming interfaces including programmatic computing calls to a node hosting the distributed ledger of a decentralized computing system, the programmatic computing calls instructing and confirming state change instructions to be transmitted to the distributed ledger of a decentralized computing system corresponding to state changes of the safe data object.

19. The computer-implemented method system of claim 11, wherein the owners comprise:

a user owner corresponding to the requesting user, and one or more provider owners associated with the centralized computing system.

20. A non-transitory computer readable medium, storing machine-interpretable instruction sets, which when executed by a processor, cause the processor to perform steps of a method for joint custodial secure storage of digital assets, with an automated smart contract data structure deployed and persisted on a distributed ledger of a decentralized computing system, the method comprising:

receiving a user's request to create a safe data object on the distributed ledger of the decentralized computing system for storage of the user's assets;

instantiating the automated smart contract data structure deployed on the distributed ledger for managing digital assets, the automated smart contract data structure comprising a list of pointers referencing a plurality of addresses, a mapping of transactions, a mapping of confirmations, and a user-configured number of required owner signatures for the transactions, each of the addresses corresponding to an owner of a plurality of owners, the owners including a user owner corresponding to the user and one or more provider owners associated with the centralized computing system, each of the required owner signatures comprising a digital signature created by the private key corresponding to each of the required owners, the automated smart contract data structure coupled to an off-chain database through one or more pointers, the off-chain database storing a set of amount thresholds used to configure variable signature requirements for transactions exceeding the amount thresholds;

generating a private key for each owner;

storing the private key of each owner in a digital asset wallet associated with the owner;

configuring risk controls in the automated smart contract data structure for the transactions;

providing an address of the safe data object to the user for depositing;

receiving a transfer of a digital asset by the user addressed to the address of the safe data object;

receiving a request from the user to initiate a transaction of a digital asset from the safe data object to a target recipient at a target address, the transaction being added to the mapping of transactions;

prompting each of the required owners to apply a digital signature to the transaction using the private key corresponding to each of the required owners;

storing a signature collected from each of the required owners in the mapping of confirmations;

confirming the mapping of confirmations contains all of the required owner signatures; and upon confirmation of the required owner signatures, transferring the digital asset to the target address.

* * * * *